(12) United States Patent
Amos et al.

(10) Patent No.: US 10,067,515 B2
(45) Date of Patent: Sep. 4, 2018

(54) RECEIVER SURGE TEST TOOL ASSEMBLY, SYSTEM, AND METHOD

(71) Applicant: The Boeing Company, Chicago, IL (US)

(72) Inventors: Michael U. Amos, Seattle, WA (US); David C. Garon, Shoreline, WA (US); Vincent S. Butterfield, Seattle, WA (US)

(73) Assignee: The Boeing Company, Chicago, IL (US)

( * ) Notice: Subject to any disclaimer, the term of this patent is extended or adjusted under 35 U.S.C. 154(b) by 339 days.

(21) Appl. No.: 15/098,305

(22) Filed: Apr. 13, 2016

(65) Prior Publication Data

US 2017/0344034 A1    Nov. 30, 2017

(51) Int. Cl.
| | |
|---|---|
| *G05D 16/20* | (2006.01) |
| *G01L 19/00* | (2006.01) |
| *F16K 5/06* | (2006.01) |
| *F16K 31/02* | (2006.01) |
| *F16K 31/12* | (2006.01) |
| *B64F 1/28* | (2006.01) |

(52) U.S. Cl.
CPC .......... *G05D 16/2093* (2013.01); *B64F 1/28* (2013.01); *F16K 5/06* (2013.01); *F16K 31/02* (2013.01); *F16K 31/12* (2013.01); *G01L 19/0092* (2013.01)

(58) Field of Classification Search
CPC ..... G05D 16/2093; F16K 31/12; F16K 31/02; F16K 5/06; B64F 1/28; G01L 19/0092
See application file for complete search history.

(56) References Cited

U.S. PATENT DOCUMENTS

| | | | | |
|---|---|---|---|---|
| 5,609,027 A | * | 3/1997 | Dunlevy | B64F 1/28 244/135 A |
| 5,775,101 A | * | 7/1998 | Dunlevy | B64F 1/28 137/219 |
| 6,324,840 B1 | * | 12/2001 | Watkins | G05D 7/0635 137/110 |
| 7,327,045 B2 | * | 2/2008 | Watkins | G05D 7/0635 137/8 |
| 7,458,543 B2 | | 12/2008 | Cutler et al. | |
| 7,665,479 B2 | | 2/2010 | Cutler et al. | |
| 7,922,122 B2 | * | 4/2011 | Carns | B64D 39/06 138/106 |
| 2017/0344034 A1 | * | 11/2017 | Amos | G05D 16/2093 |

\* cited by examiner

*Primary Examiner* — Freddie Kirkland, III

(57) ABSTRACT

A receiver surge test tool (STT) assembly, system and method for receiver surge pressure testing. The receiver STT assembly has a receiver surge test tool (STT) configured to simulate surge pressure conditions of a receiver aircraft, and to measure one or more surge pressures generated when receiving a fuel flow of fuel from a refueling source during the receiver surge pressure testing that is ground based. The receiver STT has a pipe manifold structure with inlet port(s), outlet port(s), and one or more flow lines disposed therebetween. Each flow line includes a flow meter, a pressure transducer, a shutoff valve having varying valve close rates, and a manual back pressure valve. The receiver STT assembly has a control system for controlling open and close positions of the shutoff valve, and the receiver STT, and has a data system for collecting and recording data generated during the receiver surge pressure testing.

20 Claims, 16 Drawing Sheets

RECEIVER SURGE TEST TOOL ASSEMBLY, SYSTEM, AND METHOD

This invention was made with Government support under Contract No. FA8625-11-C-6600, awarded by Department of Defense. The government has certain rights in this invention.

BACKGROUND

1) Field of the Disclosure

The disclosure relates generally to assemblies, systems, and methods for receiver surge pressure testing, and more particularly, to assemblies, systems, and methods for receiver surge pressure testing using a receiver surge test tool (STT) for aerial refueling clearance of refueling aircraft.

2) Description of Related Art

Aircraft, such as receiver aircraft, are commonly refueled in flight by refueling aircraft, such as refueling tanker aircraft. The refueling aircraft typically has a boom mechanism, or a flexible tube or hose, attached to the tail of the refueling aircraft, which physically makes a connection to the receiver aircraft to be refueled and dispenses fuel to the receiver aircraft from the refueling aircraft.

To certify or qualify an uncertified refueling aircraft for aerial refueling clearance against a receiver aircraft to be refueled, the refueling aircraft and the receiver aircraft typically undergo surge pressure testing. The surge pressure testing can be used to verify that surge pressures generated in the receiver aircraft from the refueling aircraft do not exceed the receiver aircraft's proof pressure, i.e., the level of pressure at which a tube, hose, or other fluid passage does not yield during application of internal pressure. If the surge pressures of the uncertified refueling aircraft obtained during such surge pressure testing are less than, or equal to, the surge pressures of a prior refueling aircraft design that has been certified, the uncertified refueling aircraft can become certified or qualified and granted an aerial refueling clearance.

Known systems and methods to certify or qualify an uncertified refueling aircraft, such as an uncertified refueling tanker aircraft, may involve instrumenting numerous types of receiver aircraft that will receive fuel from the refueling aircraft to be certified. Such instrumenting of each receiver aircraft may involve the installation of dynamic pressure transducers throughout the receiver aircraft fuel system, the removal of one or more refueling flow lines from the receiver aircraft and replacement with one or more aircraft pressure transducers or pressure sensors, and the testing of the instrumentation system to record all test data. However, such instrumenting may be expensive and labor intensive. Moreover, such instrumenting may be very time consuming, and it may take several years to instrument all the receiver aircraft that will receive fuel from the refueling aircraft to be certified.

In addition, known systems and methods to certify or qualify an uncertified refueling aircraft, such as an uncertified refueling tanker aircraft, may involve flight testing the refueling aircraft to be certified with numerous types of receiver aircraft that will receive fuel from the refueling aircraft to be certified. However, such flight testing of the refueling aircraft to be certified with each of the numerous types of receiver aircraft may result in having to conduct numerous flight tests, which may be expensive and time consuming. Thus, the certification or qualification of an uncertified refueling aircraft, such as an uncertified refueling tanker aircraft, may be difficult due to the expense and time involved.

Accordingly, there is a need in the art for an improved assembly, system, and method for surge pressure testing to certify an uncertified refueling aircraft for aerial refueling clearance against receiver aircraft, that are low cost, time efficient, and reliable, and that provide advantages over known assemblies, systems, and methods.

SUMMARY

Example implementations of this disclosure provide for an improved assembly, system, and method for surge pressure testing to certify an uncertified refueling aircraft for aerial refueling clearance against receiver aircraft. As discussed in the below detailed description, embodiments of the improved assembly, system, and method may provide significant advantages over known systems and methods.

In one embodiment there is provided a receiver surge test tool (STT) assembly for receiver surge pressure testing. The receiver STT assembly comprises a receiver surge test tool (STT). The receiver STT is configured to simulate surge pressure conditions of a receiver aircraft, and is configured to measure one or more surge pressures generated when receiving a fuel flow of fuel from a refueling source during the receiver surge pressure testing that is ground based.

The receiver STT has a pipe manifold structure. The pipe manifold structure comprises one or more inlet ports configured to receive the fuel flow from the refueling source. The pipe manifold structure further comprises one or more outlet ports configured for connection to a fuel return system. The pipe manifold structure further comprises one or more flow lines disposed between the one or more inlet ports and the one or more outlet ports. Each flow line is configured to move the fuel flow from the one or more inlet ports to the one or more outlet ports.

Each flow line comprises a flow meter for measuring a flow rate of the fuel flow through the flow line. Each flow line further comprises a pressure transducer for measuring the surge pressure of the fuel flow through the flow line. Each flow line further comprises a shutoff valve having varying valve close rates and having two sets of valve position indicators for indicating an open position and a close position. Each flow line further comprises a manual back pressure valve for adjusting back pressure.

The receiver STT assembly further comprises a control system coupled to the receiver STT for controlling the open position and the close position of the shutoff valve, and for controlling the receiver STT. The receiver STT assembly further comprises a data system coupled to the receiver STT for collecting and recording data generated during the receiver surge pressure testing.

In another embodiment there is provided a receiver surge test tool (STT) system for receiver surge pressure testing. The receiver STT system comprises a refueling source having a supply of fuel. The refueling source further has one or more fuel pumps configured to initiate a fuel flow of the fuel out of the refueling source and through an elongated refueling tube coupled to the refueling source.

The receiver STT system further comprises an adapter assembly having a first portion connected to the elongated refueling tube and having a second portion. The adapter assembly is configured to receive the fuel flow from the elongated refueling tube into the first portion. The adapter assembly is further configured to move the fuel flow from the first portion to the second portion.

The receiver STT system further comprises a receiver surge test tool (STT) assembly comprising a receiver surge test tool (STT) coupled to the second portion of the adapter assembly. The receiver STT is configured to simulate surge pressure conditions of a receiver aircraft. The receiver STT is further configured to measure one or more surge pressures generated when receiving the fuel flow during the receiver surge pressure testing that is ground based.

The receiver STT comprises a pipe manifold structure. The pipe manifold structure comprises an inlet port configured to receive the fuel flow from the adapter assembly. The pipe manifold structure further comprises one or more outlet ports.

The pipe manifold structure further comprises one or more flow lines disposed between the inlet port and the one or more outlet ports. Each flow line is configured to move the fuel flow from the inlet port to the one or more outlet ports. Each flow line comprises a flow meter, a pressure transducer, a shutoff valve having varying valve close rates and having two sets of valve position indicators for indicating an open position and a close position, and a manual back pressure valve.

The receiver STT further comprises a temperature probe coupled to the inlet port to measure a temperature of the fuel flow received into the inlet port. The receiver STT further comprises one or more drive connection ports configured to connect to a valve control system. The valve control system comprises one of a pneumatic system, a hydraulic system, and an electrical system, to drive closure of each shutoff valve.

The receiver STT system further comprises a fuel return system connected to the one or more outlet ports of the receiver STT. The fuel return system is configured to receive the fuel flow from the receiver STT and is configured to move the fuel flow to a fuel reservoir.

The receiver STT system further comprises a control system coupled to the receiver STT and the adapter assembly, for controlling the open position and the close position of the shutoff valve, for controlling the receiver STT, and for controlling the adapter assembly. The receiver STT system further comprises a data system coupled to the receiver STT and the adapter assembly, for collecting and recording data generated during the receiver surge pressure testing.

In another embodiment there is provided a method of using a receiver surge test tool (STT) system to conduct receiver surge pressure testing to certify an uncertified refueling tanker aircraft for aerial refueling clearance. The method comprises the step of providing the receiver surge test tool (STT) system having a receiver surge test tool (STT) configured to simulate surge pressure conditions of a receiver aircraft.

The method further comprises the step of using the receiver STT system to conduct receiver surge pressure testing, that is ground based, of a certified refueling tanker aircraft, to obtain a baseline set of surge pressure data comprising baseline data of surge pressures generated in the receiver STT, when the receiver STT receives fuel from the certified refueling tanker aircraft. The method further comprises the step of using the receiver STT system to conduct receiver surge pressure testing, that is ground based, of the uncertified refueling tanker aircraft to obtain a test set of surge pressure data comprising test data of surge pressures generated in the receiver STT, when the receiver STT receives fuel from the uncertified refueling tanker aircraft.

The method further comprises the step of comparing the test set of surge pressure data against the baseline set of surge pressure data to obtain a set of comparison data. The method further comprises the step of using the set of comparison data to verify that the surge pressures of the test set of surge pressure data are less than, or equal to, the surge pressures of the baseline set of surge pressure data. The method further comprises the step of certifying the uncertified refueling tanker aircraft for aerial refueling clearance, if the surge pressures of the test set of surge pressure data are less than, or equal to, the surge pressures of the baseline set of surge pressure data.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate exemplary embodiments, but which are not necessarily drawn to scale, wherein.

Each figure shown in this disclosure shows a variation of an aspect of the embodiments presented, and only differences will be discussed in detail.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and fully convey the scope of the disclosure to those skilled in the art.

Figure 1:
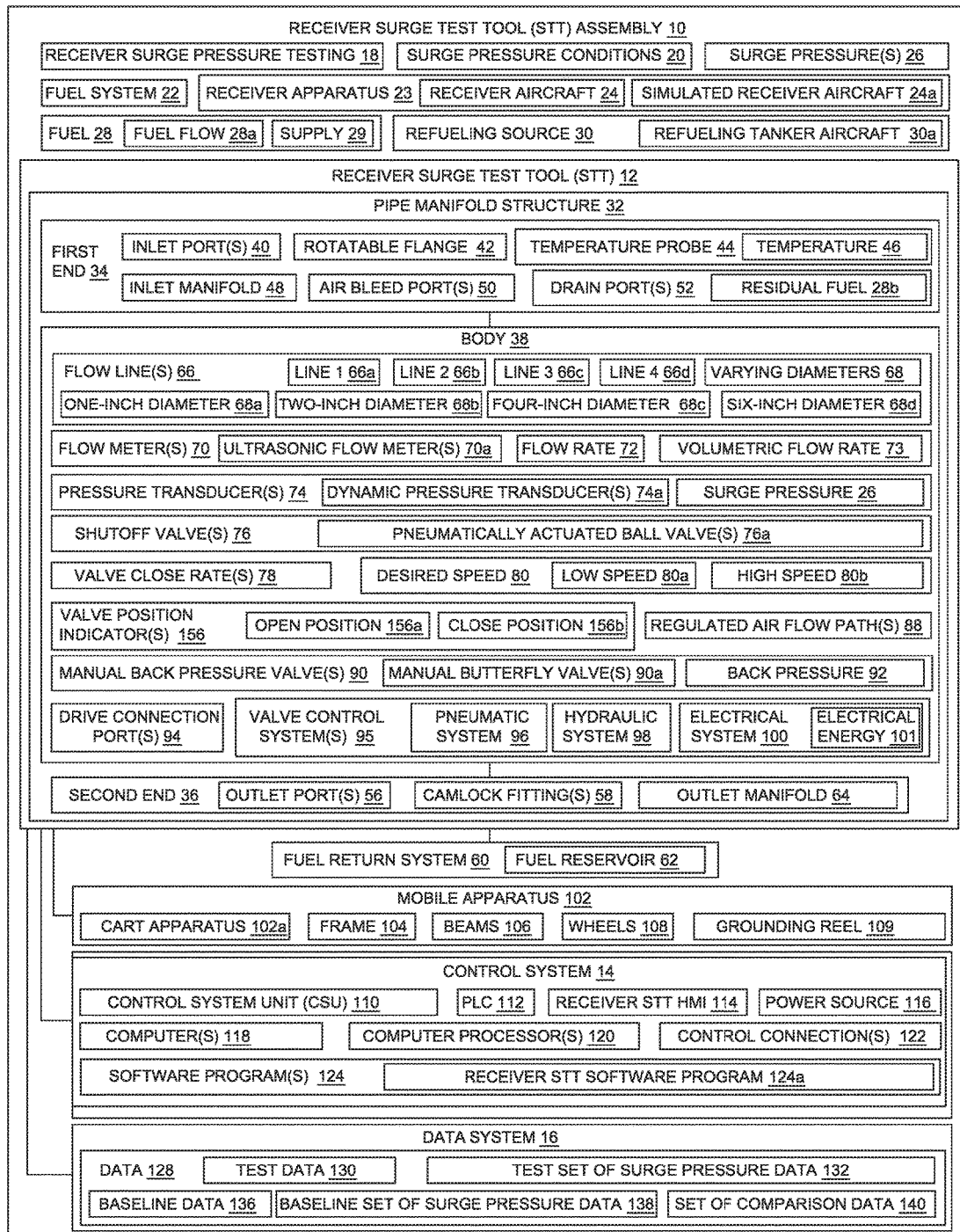
FIG. 1 is an illustration of a functional block diagram of an exemplary embodiment of a receiver surge test tool (STT) assembly of the disclosure.
Figure 2A:
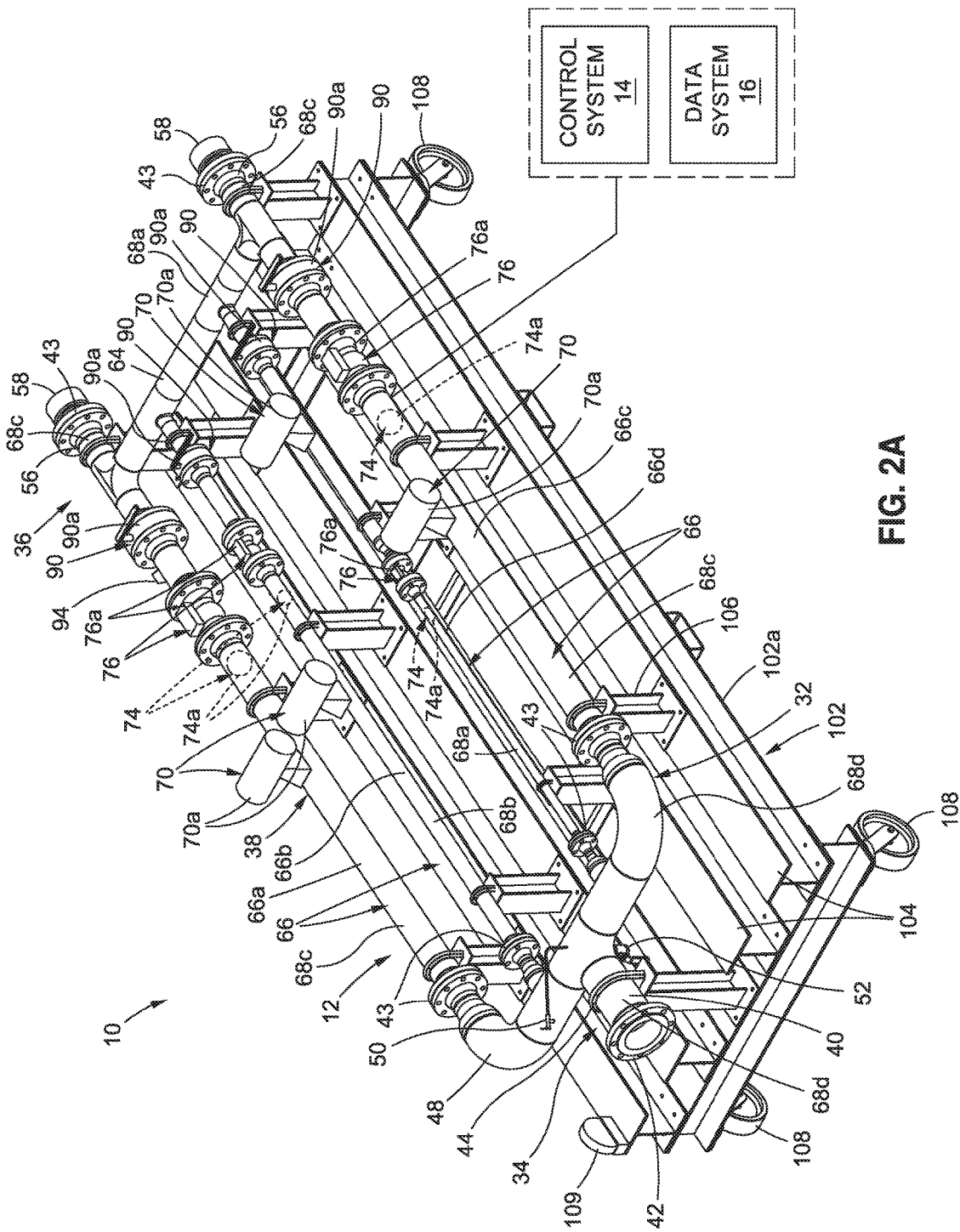
FIG. 2A is an illustration of a front perspective view of an exemplary embodiment of a receiver surge test tool (STT) assembly of the disclosure.

Now referring to the Figures, FIG. 1 is an illustration of a functional block diagram of an exemplary embodiment of a receiver surge test tool (STT) assembly 10 of the disclosure. FIG. 2A is an illustration of a front perspective view of an exemplary embodiment of the receiver surge test tool (STT) assembly 10 of the disclosure.

In one embodiment, as shown in FIGS. 1 and 2A, there is provided the receiver surge test tool (STT) assembly 10 for receiver surge pressure testing 18 (see FIG. 1). The receiver surge pressure testing 18 (see FIG. 1) is preferably ground based, or conducted at ground level. As shown in FIGS. 1 and 2A, the receiver STT assembly 10 comprises a receiver surge test tool (STT) 12, a control system 14 coupled to the receiver STT 12, and a data system 16 coupled to the receiver STT 12. As further shown in FIGS. 1 and 2A, the receiver STT assembly 10 may comprise a mobile apparatus 102 coupled to the receiver STT 12.

The receiver surge pressure testing 18 (see FIG. 1) involves configuring or instrumenting the receiver STT 12 (see FIGS. 1, 2A) to simulate surge pressure conditions 20 (see FIG. 1) of a fuel system 22 (see FIG. 1) of a receiver apparatus 23 (see FIG. 1), such as a receiver aircraft 24 (see FIG. 1). Thus, the receiver STT 12 (see FIGS. 1, 2A) acts or functions as a simulated receiver aircraft 24a (see FIG. 1).

The receiver surge pressure testing 18 (see FIG. 1) further involves configuring or instrumenting the receiver STT 12 (see FIGS. 1, 2A) to measure one or more surge pressures 26 (see FIG. 1) generated within the receiver STT 12 (see FIGS. 1, 2A), when the receiver STT 12 (see FIGS. 1, 2A) receives fuel 28 (see FIG. 1), such as a fuel flow 28a (see FIG. 1) of fuel 28 (see FIG. 1). The fuel flow 28a (see FIG. 1) of fuel 28 (see FIG. 1) is received by the receiver STT 12 (see FIG. 1, 2A) from a supply 29 (see FIG. 1) of fuel 28 (see FIG. 1) from a refueling source 30 (see FIG. 1), during the receiver surge pressure testing 18 (see FIG. 1) that is ground based. The fuel 28 (see FIG. 1) may flow with working pressures up to 240 psi (pounds per square inch) or more on the receiver STT 12 (see FIGS. 1, 2A), with surge pressures 26 (see FIG. 1) up to 240 psi or more, and with flow rates 72 (see FIG. 1) up to 1300 gpm (gallons per minute) or more.

Figure 6:
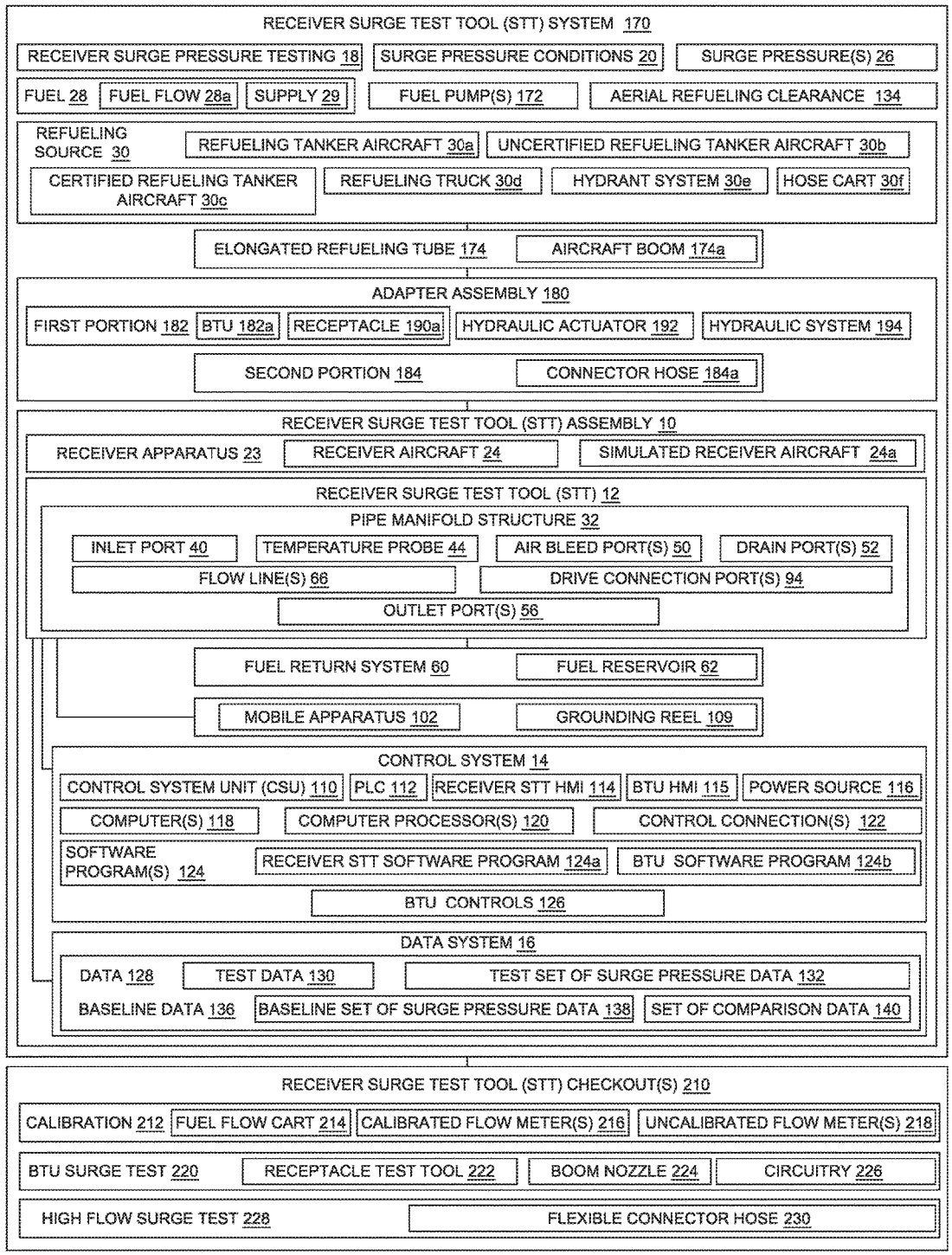
FIG. 6 is an illustration of a functional block diagram of an exemplary embodiment of a receiver surge test tool (STT) system of the disclosure.

In one embodiment, the refueling source 30 (see FIG. 1) comprises a refueling tanker aircraft 30a (see FIGS. 1, 6).

The refueling tanker aircraft 30a (see FIGS. 1, 6) comprises an uncertified refueling tanker aircraft 30b (see FIG. 6), a certified refueling tanker aircraft 30c (see FIG. 6), or another suitable refueling tanker aircraft 30a (see FIGS. 1, 6).

As used herein, an "uncertified refueling tanker aircraft" means a refueling tanker aircraft that is not certified or qualified for aerial refueling clearance for in-flight aerial refueling missions, and does not meet the surge pressure requirements for receiver aircraft to be refueled. As used herein, a "certified refueling tanker aircraft" means a refueling tanker aircraft that is certified or qualified for aerial refueling clearance for in-flight aerial refueling missions, and meets the surge pressure requirements for receiver aircraft to be refueled.

Figure 2B:
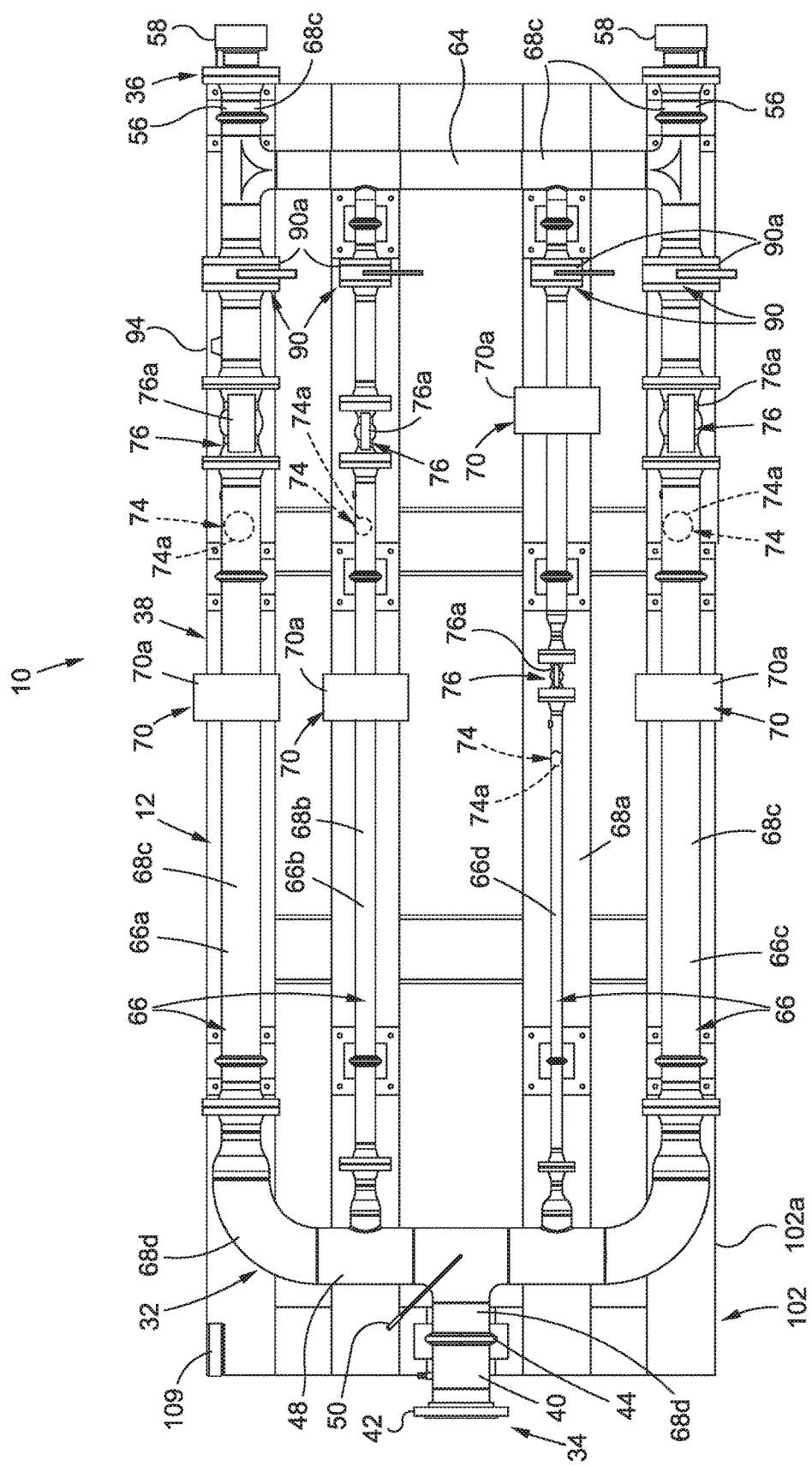
FIG. 2B is an illustration of a top view of a receiver surge test tool (STT) and a mobile apparatus of the receiver surge test tool (STT) assembly of FIG. 2A.
Figure 2C:
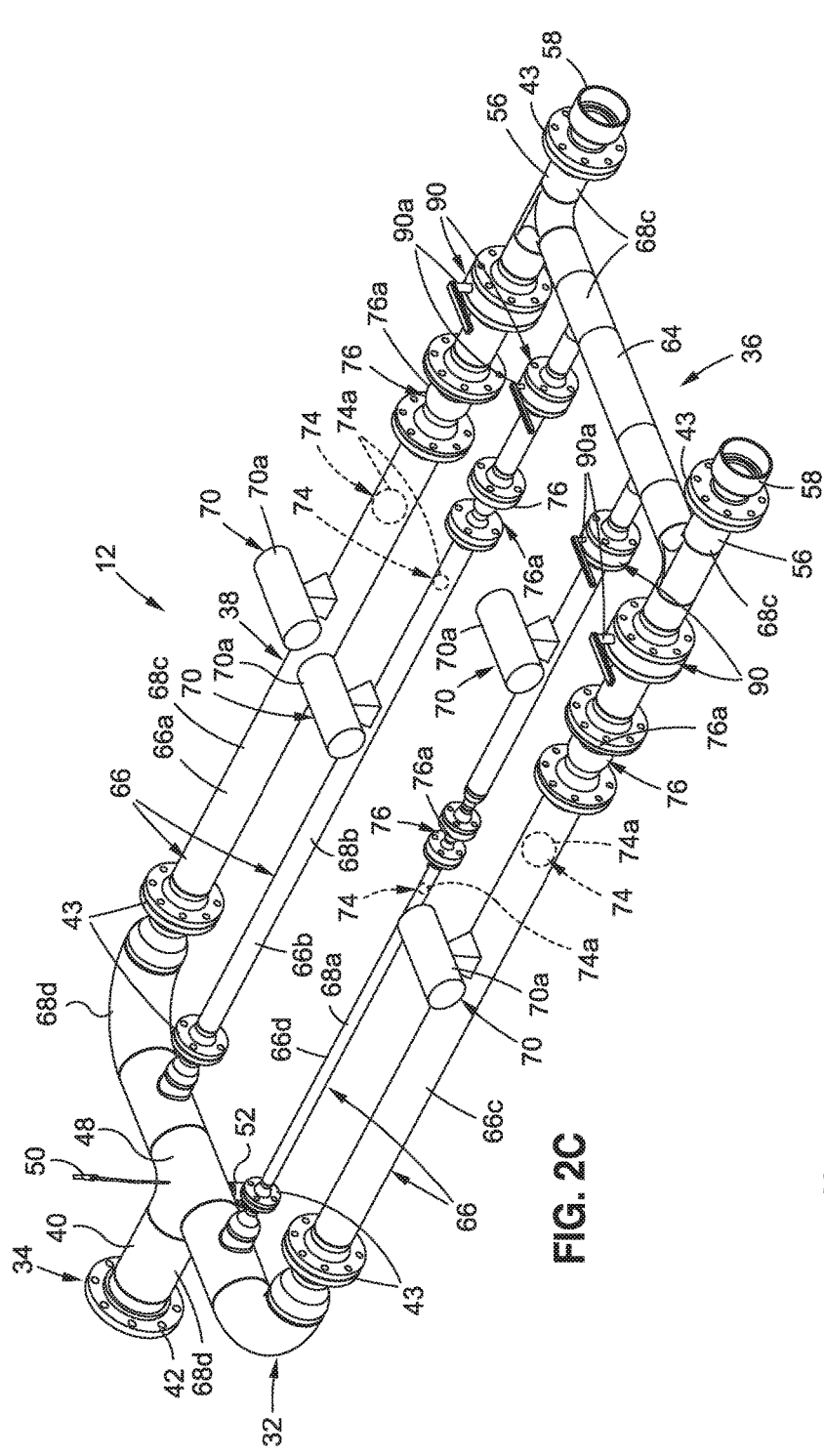
FIG. 2C is an illustration of a back perspective view of the receiver surge test tool (STT) of the receiver surge test tool (STT) assembly of FIG. 2A.
Figure 2D:
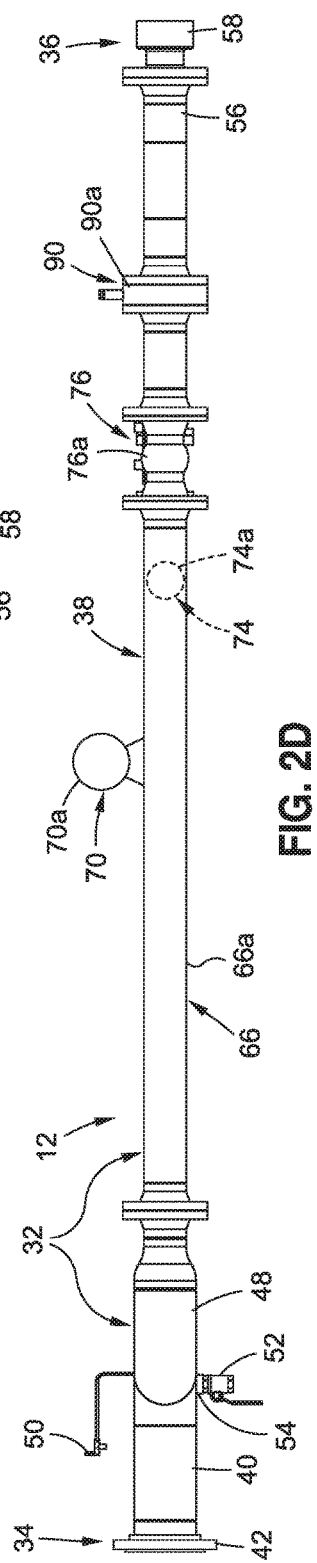
FIG. 2D is an illustration of a side perspective view of the receiver surge test tool
(STT) of FIG. 2C.

As shown in FIGS. 1 and 2A-2D, the receiver STT assembly 10 comprises the receiver STT 12. FIG. 2B is an illustration of a top view of the receiver STT 12 and the mobile apparatus 102 of the receiver STT assembly 10 of FIG. 2A. FIG. 2C is an illustration of a back perspective view of the receiver STT 12 of the receiver STT assembly 10 of FIG. 2A. FIG. 2D is an illustration of a side perspective view of the receiver STT 12 of FIG. 2C.

The receiver STT assembly 10 (see FIGS. 1-2D) has a pipe manifold structure 32 (see FIGS. 1-2D). As shown in FIGS. 1-2D, the pipe manifold structure 32 comprises a first end 34, a second end 36, and a body 38 disposed between the first end 34 and the second end 36.

As shown in FIGS. 1-2D, the first end 34 has one or more inlet ports 40. Preferably, the pipe manifold structure 32 (see FIGS. 1-2D) of the receiver STT 12 (see FIGS. 1-2D) has one inlet port 40 (see FIGS. 1-2D). However, the pipe manifold structure 32 (see FIGS. 1-2D) may also have another suitable number of inlet ports 40 (see FIGS. 1-2D). Each inlet port 40 (see FIGS. 1-2D) preferably has a rotatable flange 42 (see FIGS. 1-2D) attached at the end of the inlet port 40 (see FIGS. 1-2D). Each inlet port 40 (see FIGS. 1-2D) is configured to receive the fuel flow 28a (see FIG. 1) from the refueling source 30 (see FIG. 1). Additional flanges 43 (see FIGS. 2A, 2C) may be used to connect one or more flow lines 66 (see FIGS. 2A, 2C) of the pipe manifold structure 32 (see FIGS. 2AC, 2C) of the receiver STT 12 (see FIGS. 2A, 2C). The inlet port 40 (see FIGS. 1-2D) preferably has a six-inch diameter 68d (see FIG. 1) with the rotatable flange 42 and is preferably configured for attachment to a connector hose 184a (see FIG. 6), such as a six-inch diameter connector hose or flexible hose.

The receiver STT 12 (see FIGS. 1-2D) may further comprise a temperature probe 44 (see FIGS. 1-2D), for example, a resistance temperature detector (RTD) or another suitable temperature measuring device, coupled to one of the one or more inlet ports 40 (see FIGS. 1-2D) at the first end 34 (see FIGS. 1-2D). The temperature probe 44 (see FIGS. 1-2D) measures a temperature 46 (see FIG. 1) of the fuel flow 28a (see FIG. 1) received into the one or more inlet ports 40 (see FIGS. 1-2D).

As shown in FIGS. 1-2D, the first end 34 of the receiver STT 12 may further comprise an inlet manifold 48. The inlet manifold 48 (see FIGS. 1-2D) may be connected or joined to the one or more inlet ports 40 (see FIGS. 1-2D), or the inlet manifold 48 (see FIGS. 1-2D) may be integrally formed with the one or more inlet ports 40 (see FIGS. 1-2D).

One or more air bleed ports 50 (see FIGS. 1-2D) may be coupled to the receiver STT 12 (see FIGS. 1-2D). The one or more air bleed ports 50 (see FIGS. 1-2D) may be attached to the inlet manifold 48 (see FIGS. 1-2D) at the first end 34 (see FIGS. 1-2D) of the pipe manifold structure 32 (see FIGS. 1-2D) of the receiver STT 12 (see FIGS. 1-2D). One or more air bleed ports 50 (see FIGS. 1-2D) may also optionally be attached at another location on the pipe manifold structure 32 (see FIG. 1). Each air bleed port 50 (see FIGS. 1-2D) is preferably configured to prime the receiver STT 12 (see FIGS. 1-2D) prior to the receiver surge pressure testing 18 (see FIG. 1) to ensure no air is in the receiver STT 12 (see FIGS. 1-2D) to interfere with flow meter 70 (see FIGS. 1-2D) readings, causing them to read incorrectly, and/or to dampen surge pressures 26 (see FIG. 1).

One or more drain ports 52 (see FIGS. 1, 2A, 2C, 2D) may be coupled to the receiver STT 12 (see FIGS. 1-2D). The one or more drain ports 52 (see FIGS. 1-2D) may be attached to an underside area 54 (see FIG. 2D) of the inlet manifold 48 (see FIG. 2D) at the first end 34 (see FIG. 2D) of the pipe manifold structure 32 (see FIG. 2D) of the receiver STT 12 (see FIG. 2D). One or more drain ports 52 (see FIG. 1) may also optionally be attached at another location on the pipe manifold structure 32 (see FIG. 1). Each drain port 52 (see FIGS. 1, 2A, 2C, 2D) is preferably configured to drain residual fuel 28b (see FIG. 1) out of the receiver STT 12 (see FIGS. 1-2D) before disconnecting or disassembling the receiver STT 12 (see FIGS. 1-2D), and/or after the receiver surge pressure testing 18 (see FIG. 1) has been conducted.

As shown in FIGS. 1-2D, the second end 36 of the pipe manifold structure 32 has one or more outlet ports 56. Preferably, the pipe manifold structure 32 (see FIGS. 1-2D) of the receiver STT 12 (see FIGS. 1-2D) has two outlet ports 56 (see FIGS. 1-2D). However, the pipe manifold structure 32 (see FIG. 1) may also have another suitable number of outlet ports 56 (see FIG. 1). Each outlet port 56 (see FIGS. 1-2D) may have a camlock fitting 58 (see FIGS. 1-2D) attached to the end of each outlet port 56 (see FIGS. 1-2D), which facilitates attachment of a connection element 208 (see FIG. 7), such as a four-inch diameter flexible hose, to a fuel return system 60 (see FIGS. 1, 6, 7) having a fuel reservoir 62 (see FIGS. 1, 6, 7). The fuel return system 60 (see FIGS. 1, 6, 7) with the fuel reservoir 62 (see FIGS. 1, 6, 7) is preferably configured for collection of the fuel 28 (see FIG. 1) from the fuel flow 28a (see FIG. 1) out of the receiver STT 12 (see FIGS. 1-2D, 7).

As shown in FIGS. 1-2C, the second end 36 of the pipe manifold structure 32 may further comprise an outlet manifold 64. The outlet manifold 64 (see FIGS. 1-2C) may be connected or joined to the one or more outlet ports 56 (see FIGS. 1-2C), or the outlet manifold 64 (see FIGS. 1-2C) may be integrally formed with the one or more outlet ports 56 (see FIGS. 1-2C).

As shown in FIGS. 1-2D, the body 38 of the pipe manifold structure 32 of the receiver STT 12 comprises one or more flow lines 66 disposed between the first end 34 with the one or more inlet ports 40, and the second end 36 with the one or more outlet ports 56. Each flow line 66 (see FIGS. 1-2D) is configured to move the fuel flow 28a (see FIG. 1) of fuel 28 (see FIG. 1) from the one or more inlet ports 40 (see FIGS. 1-2D) to the one or more outlet ports 56 (see FIGS. 1-2D).

As shown in FIGS. 1-2C, the pipe manifold structure 32 preferably comprises four (4) flow lines 66, such as line 1 66a (see also FIG. 2D), line 2 66b, line 3 66c, and line 4 66d. However, the pipe manifold structure 32 (see FIG. 1) of the receiver STT 12 (see FIG. 1) may have another suitable number of flow lines 66 (see FIG. 1). The four (4) flow lines 66 (see FIG. 1) may have varying diameters 68 (see FIG. 1), including one (1) one-inch diameter 68a (see FIGS. 1-2C) flow line 66 (see FIGS. 1-2C), one (1) two-inch diameter 68b (see FIGS. 1-2C) flow line 66 (see FIGS. 1-2C), and two (2) four-inch diameter 68c (see FIGS. 1-2C) flow lines 66 (see FIGS. 1-2C). In addition, the one or more inlet ports 40 (see FIGS. 1-2C) and the inlet manifold 48 (see FIGS. 1-2C) may have a six-inch diameter 68d (see FIGS. 1-2C), and the one or more outlet ports 56 (see FIGS. 1-2C) and the outlet manifold 64 (see FIGS. 1-2C) may have a four-inch diameter 68c (see FIGS. 1-2C).

As shown in FIGS. 1-2D, each flow line 66 comprises a flow meter 70 for measuring a flow rate 72 (see FIG. 1) of the fuel flow 28a (see FIG. 1) through the flow line 66. Preferably, the flow meter 70 (see FIGS. 1-2D) comprises an ultrasonic flow meter 70a (see FIGS. 1-2D) for measuring a volumetric flow rate 73 (see FIG. 1) of the fuel flow 28a (see FIG. 1) through the flow line 66 (see FIGS. 1-2D), or the flow meter 70 may comprise another suitable type of flow meter. Preferably, with four (4) flow lines 66 (see FIGS. 1-2D), there are four (4) flow meters 70 (see FIGS. 1-2D), or one (1) flow meter 70 (see FIGS. 1-2D) per flow line 66 (see FIGS. 1-2D). As used herein, "volumetric flow rate" means a volume of a fluid, such as fuel or fuel flow, that passes through a given surface per unit time, and it may be calculated from the flow velocity and the surface area of the surface through which the fluid, such as the fuel or fuel flow, passes.

As shown in FIGS. 1-2D, each flow line 66 further comprises a pressure transducer 74 for measuring the surge pressure 26 (see FIG. 1) of the fuel flow 28a (see FIG. 1) through the flow line 66. Preferably, the pressure transducer 74 (see FIGS. 1-2D) comprises a dynamic pressure transducer 74a (see FIGS. 1-2D) for measuring the surge pressure 26 (see FIG. 1) of the fuel flow 28a (see FIG. 1) through the flow line 66 (see FIGS. 1-2D), or the pressure transducer 74 may comprise another suitable type of pressure transducer. An exemplary pressure transducer may include a KULITE aircraft pressure transducer obtained from Kulite Semiconductor Products, Inc. of Leonia, N.J. (KULITE is a registered trademark owned by Kulite Semiconductor Products, Inc. of Leonia, N.J.) Preferably, with four (4) flow lines 66 (see FIGS. 1-2D), there are four (4) pressure transducers 74 (see FIGS. 1-2D), or one (1) pressure transducer 74 (see FIGS. 1-2D) per flow line 66 (see FIGS. 1-2D). As used herein, "pressure transducer" means a pressure sensor that measures pressure of a fuel, and in particular, high speed surge pressure of a fuel, and that generates an electrical signal as a function of the pressure measured.

As shown in FIGS. 1-2D, each flow line 66 further comprises a shutoff valve 76. Each shutoff valve 76 (see FIGS. 1-2D) preferably has varying valve close rates 78 (see FIG. 1), which may be set at a desired speed 80 (see FIG. 1), such as a low speed 80a (see FIG. 1), for example, a 2 (two) second valve close rate 78a (+/−0.1 second) (see FIG. 5), or such as a high speed 80b (see FIG. 1), for example, a 0.5 (zero point five) second valve close rate 78b (+/−0.1 second) (see FIG. 5). Each shutoff valve 76 (see FIGS. 1-2D) further has two (2) sets of valve position indicators 156 (see FIGS. 1, 5) for indicating an open position 156a (see FIGS. 1, 5) and a close position 156b (see FIGS. 1, 5) of the shutoff valve 76 (see FIGS. 1-2D, 5). Preferably, the shutoff valve 76 (see FIGS. 1-2D) comprises a pneumatically actuated ball valve 76a (see FIGS. 1-2D), or another suitable type of shutoff valve. The shutoff valve 76 (see FIGS. 1-2D), such as the pneumatically actuated ball valve 76a (see FIGS. 1-2D), preferably has two (2) different regulated air flow paths 88 (see FIG. 1) set to cause valve close rates 78 (see FIG. 1) comprising one of either the 2 second valve close rate 78a (+/−0.1 second) (see FIG. 5), or the 0.5 second valve close rate 78b (+/−0.1 second) (see FIG. 5). As used herein, a "shutoff valve" means a valve that regulates or controls the flow of a fluid, such as fuel, through a flow line by fully opening or closing a passageway in the flow line, where the shutoff valve includes a pneumatically actuated ball valve that uses a round ball valve member with one or more paths between ports passing through it, such that by rotating the round ball valve member, fluid flow, such as fuel flow, can be directed between different ports.

As discussed below, the control system 14 (see FIG. 1) may include a receiver surge test tool (STT) human-machine interface (HMI) 114 (see FIG. 5) having a status button 82 (see FIG. 5) that indicates an OPEN status 84 (see FIG. 5) and a CLOSE status 86 (see FIG. 5) for each shutoff valve 76 (see FIGS. 1, 5). Preferably, with four (4) flow lines 66 (see FIGS. 1-2D), there are four (4) shutoff valves 76 (see FIGS. 1-2D), or one (1) shutoff valve 76 (see FIGS. 1-2D) per flow line 66 (see FIGS. 1-2D).

As shown in FIGS. 1-2D, each flow line 66 further comprises a manual back pressure valve 90 for adjusting back pressure 92 (see FIG. 1). Preferably, the manual back pressure valve 90 (see FIGS. 1-2D) comprises a manual butterfly valve 90a (see FIGS. 1-2D) for creating different back pressures 92 (see FIG. 1) that simulate different receiver aircraft 24 (see FIG. 1), or the manual back pressure valve 90 may comprise another suitable type of back pressure valve. Preferably, with four (4) flow lines 66 (see FIGS. 1-2D), there are four (4) manual back pressure valves 90 (see FIGS. 1-2D), or one (1) manual back pressure valve 90 (see FIGS. 1-2D) per flow line 66 (see FIGS. 1-2D). As used herein, "back pressure" means a pressure that is opposed to a desired flow of a fluid, such as fuel, in a confined place such as a flow line, and where the flow of the fluid, such as fuel, is reduced due to resistance.

As shown in FIGS. 2A-2C, preferably for the flow lines 66, including line 1 66a, line 2 66b, and line 3 66c, the flow meter 70, the pressure transducer 74, the shutoff valve 76, and the manual back pressure valve 90 are positioned in series, in this order, from the first end 34 to the second end 36 of the receiver STT 12. As further shown in FIGS. 2A-2C, preferably for the flow line 66, including line 4 66d, the pressure transducer 74, the shutoff valve 76, the flow meter 70, and the manual back pressure valve 90 are positioned in series, in this order, from the first end 34 to the second end 36 of the receiver STT 12.

The receiver STT 12 (see FIGS. 1-2B) of the receiver STT assembly 10 (see FIGS. 1-2B) may further comprise one or more drive connection ports 94 (see FIGS. 1-2B) for connection to, or configured to connect to, a valve control system 95 (see FIG. 1) that is separate from the receiver STT 12 (see FIGS. 1-2B). The valve control system 95 (see FIG. 1) may comprise one of a pneumatic system 96 (see FIGS. 1, 4A, 7), a hydraulic system 98 (see FIGS. 1, 4B), and an electrical system 100 (see FIG. 1), or another suitable valve control system 95 (see FIG. 1), to provide energy to drive closure of each shutoff valve 76 (see FIGS. 1-2C, 4A-4B).

If the valve control system 95 (see FIG. 1) comprises the pneumatic system 96 (see FIGS. 1, 4A, 7), the drive connection port 94 (see FIGS. 1-2B, 7) is preferably connected to the pneumatic system 96 (see FIGS. 1, 4A, 7), which controls an amount of air 97 (see FIG. 4A) from an air supply 97a (see FIG. 7) being provided to the receiver STT 12 (see FIGS. 1-2B, 4A, 7) to drive closure of each shutoff valve 76 (see FIGS. 1-2B, 4A). If the valve control system 95 (see FIG. 1) comprises the hydraulic system 98 (see FIGS. 1, 4B), the drive connection port 94 (see FIGS. 1-2B) is preferably connected to the hydraulic system 98 (see FIG. 4B), which controls an amount of hydraulic fluid 99 (see FIG. 4B) being provided to the receiver STT 12 (see FIGS. 1, 4B) to drive closure of each shutoff valve 76 (see FIGS. 1-2B, 4B). If the valve control system 95 (see FIG. 1) comprises an electrical system 100 (see FIG. 1), the drive connection port 94 (see FIGS. 1-2B) is preferably connected to the electrical system 100 (see FIG. 1), which provides electrical energy 101 (see FIG. 1) to the receiver STT 12 (see FIG. 1) to drive closure of each shutoff valve 76 (see FIGS. 1-2B).

Figure 2E:
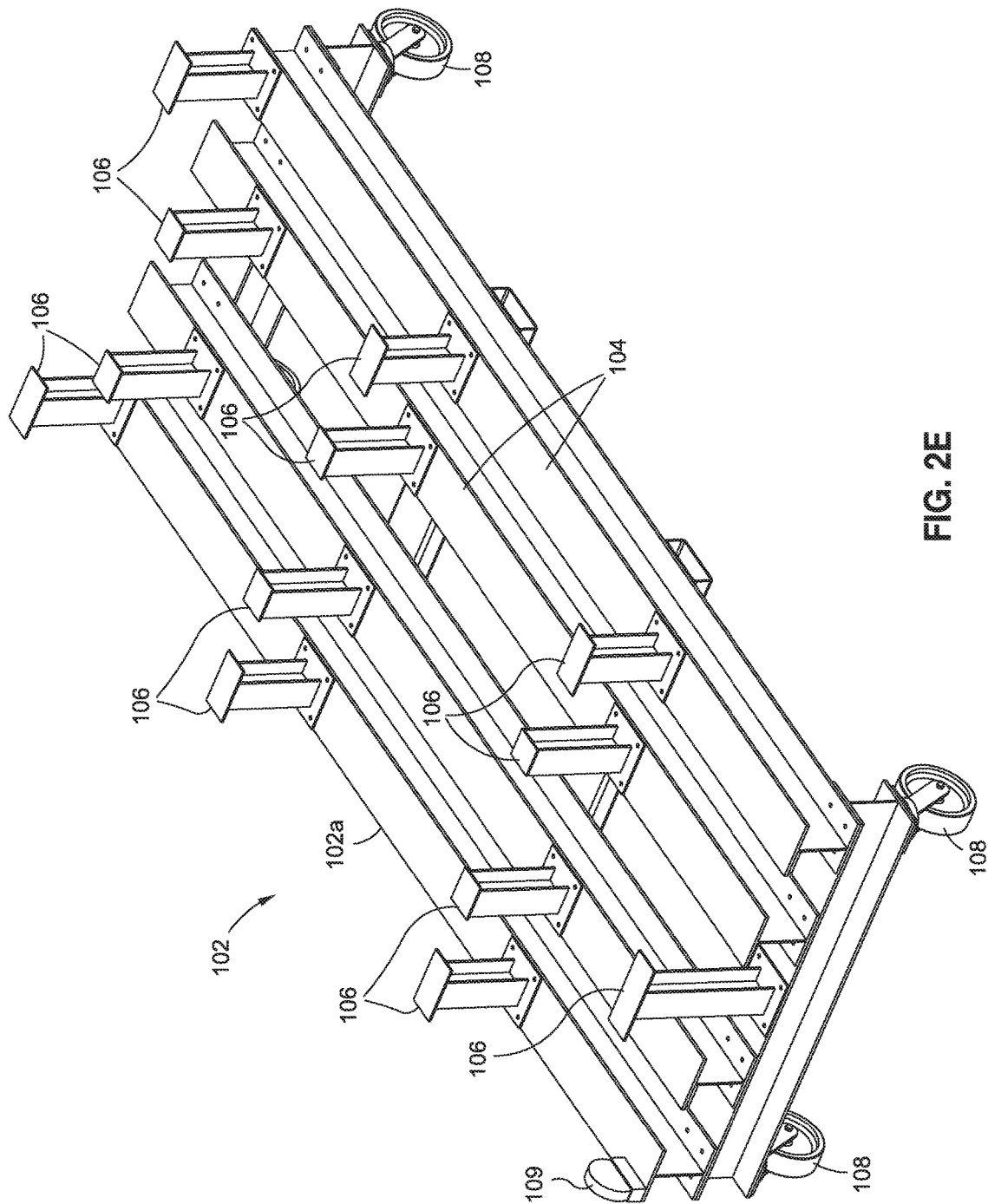
FIG. 2E is an illustration of a front perspective view of a mobile apparatus of the receiver surge test tool (STT) assembly of FIG. 2A.

The receiver STT assembly 10 (see FIGS. 1-2B, 2E) may further comprise the mobile apparatus 102 (see FIGS. 1-2B, 2E) coupled to the receiver STT 12 (see FIGS. 1-2B, 2E). FIG. 2E is an illustration of a front perspective view of the mobile apparatus 102 of the receiver STT assembly 10 of FIG. 2A. The mobile apparatus 102 (see FIGS. 1-2B, 2E) allows the receiver STT 12 (see FIGS. 1-2B, 2E) to be mobile and moved to different locations, such as testing locations for conducting the receiver surge pressure testing 18 (see FIG. 1). The mobile apparatus 102 (see FIGS. 1-2B, 2E) also stabilizes the receiver STT 12 (see FIGS. 1-2B, 2E) against any movement that may be caused by forces from the surge pressure 26 (see FIG. 1). As shown in FIGS. 1-2B and 2E, the mobile apparatus 102 may comprise a cart apparatus 102a. As further shown in FIGS. 1, 2A, 2E, the mobile apparatus 102, such as in the form of cart apparatus 102a, has a frame 104 with a plurality of beams 106 coupled or attached to various locations on the top of the frame 104, and a plurality of wheels 108 coupled or attached to the bottom of the frame 104. The mobile apparatus 102 (see FIG. 1) may also comprise another suitable vehicle or structure that allows the receiver STT 12 (see FIG. 1) to be mobile.

As shown in FIGS. 1-2B, 2E, the receiver STT assembly 10 may further comprise a grounding reel 109 configured to ground the receiver STT 12 to prevent static buildup in the one or more flow lines 66. As shown in FIGS. 2A and 2E, the grounding reel 109 may be coupled to the frame 104 of the mobile apparatus 102. However, the grounding reel 109 (see FIG. 1) may also be coupled to another suitable portion or location on the mobile apparatus 102 (see FIG. 1), on the receiver STT assembly 10 (see FIG. 1), or on the receiver STT 12 (see FIG. 1).

As shown in FIGS. 1 and 2A, the receiver STT assembly 10 further comprises the control system 14 coupled to the receiver STT 12 for controlling the open position 156a (see FIG. 1) and the close position 156b (see FIG. 1) of the shutoff valve 76, and for controlling the receiver STT 12. The control system 14 (see FIGS. 1, 2A) preferably comprises a control system unit (CSU) 110 (see FIG. 1). The CSU 110 (see FIG. 1) of the receiver STT assembly 10 (see FIG. 1) may comprise one or more programmable logic controllers (PLCs) 112 (see FIG. 1) and a receiver surge test tool (STT) human-machine interface (HMI) 114 (see FIGS. 1, 5).

As used herein, a "programmable logic controller (PLC)" means a digital computer control system used for automation of a mechanical or electromechanical process that continuously monitors the state of input conditions or devices and makes decisions based upon a custom program to control the state of output results or devices. The PLC has the ability to change and replicate an operation or process, while collecting and communicating data or information.

As further shown in FIG. 1, the control system 14 preferably comprises a power source 116, one or more computers 118 with one or more computer processors 120, one or more control connections 122, and one or more software programs 124. The one or more software programs 124 (see FIG. 1) may comprise a receiver surge test tool (STT) software program 124*a* (see FIG. 1), or another suitable software program 124 (see FIG. 1). The control system 14 (see FIG. 1) may also comprise additional suitable controls and control features.

For embodiments of a receiver surge test tool system 170 (see FIG. 6), discussed in detail below, comprising the receiver STT assembly 10 (see FIGS. 1, 6) and a boom test unit (BTU) 182*a* (see FIG. 6), the control system 14 (see FIG. 6) may further include a boom test unit (BTU) human-machine interface (HMI) 115, a boom test unit (BTU) software program 124*b* (see FIG. 6), boom test unit (BTU) controls 126 (see FIG. 6), and/or additional suitable controls and control features.

As shown in FIGS. 1 and 2A, the receiver STT assembly 10 further comprises the data system 16 coupled to the receiver STT 12 for collecting and recording data 128 (see FIG. 1) generated during the receiver surge pressure testing 18 (see FIG. 1). The data 128 (see FIG. 1) comprises test data 130 (see FIG. 1), baseline data 136 (see FIG. 1), or other suitable data 128 (see FIG. 1) obtained or generated during receiver surge pressure testing 18 (see FIG. 1).

A test set of surge pressure data 132 (see FIG. 1) comprises test data 130 (see FIG. 1) of surge pressures 26 (see FIG. 1) generated in the receiver STT 12 (see FIG. 1) during receiver surge pressure testing 18 (see FIG. 1), when the receiver STT 12 (see FIG. 1) receives fuel 28 (see FIG. 1) from a refueling tanker aircraft 30*a* (see FIG. 1) comprising the uncertified refueling tanker aircraft 30*b* (see FIG. 6) to be certified for aerial refueling clearance 134 (see FIG. 6). A baseline set of surge pressure data 138 (see FIG. 1) comprises baseline data 136 (see FIG. 1) of surge pressures 26 (see FIG. 1) generated in the receiver STT 12 (see FIG. 1) during receiver surge pressure testing 18 (see FIG. 1), when the receiver STT 12 (see FIG. 1) receives fuel 28 (see FIG. 1) from the refueling tanker aircraft 30*a* (see FIG. 1) comprising the certified refueling tanker aircraft 30*c* (see FIG. 6).

As discussed in more detail below with respect to FIG. 10 and a method 250 for receiver surge pressure testing 18 (see FIG. 1), the test set of surge pressure data 132 (see FIG. 1) is preferably compared against the baseline set of surge pressure data 138 (see FIG. 1) to obtain a set of comparison data 140 (see FIG. 1). The comparison data 140 (see FIG. 1) is used to verify that surge pressures 26 (see FIG. 6) of the test set of surge pressure data 132 (see FIG. 1) are less than, or equal to, the surge pressures 26 (see FIG. 6) of the baseline set of surge pressure data 138 (see FIG. 1).

Figure 3:
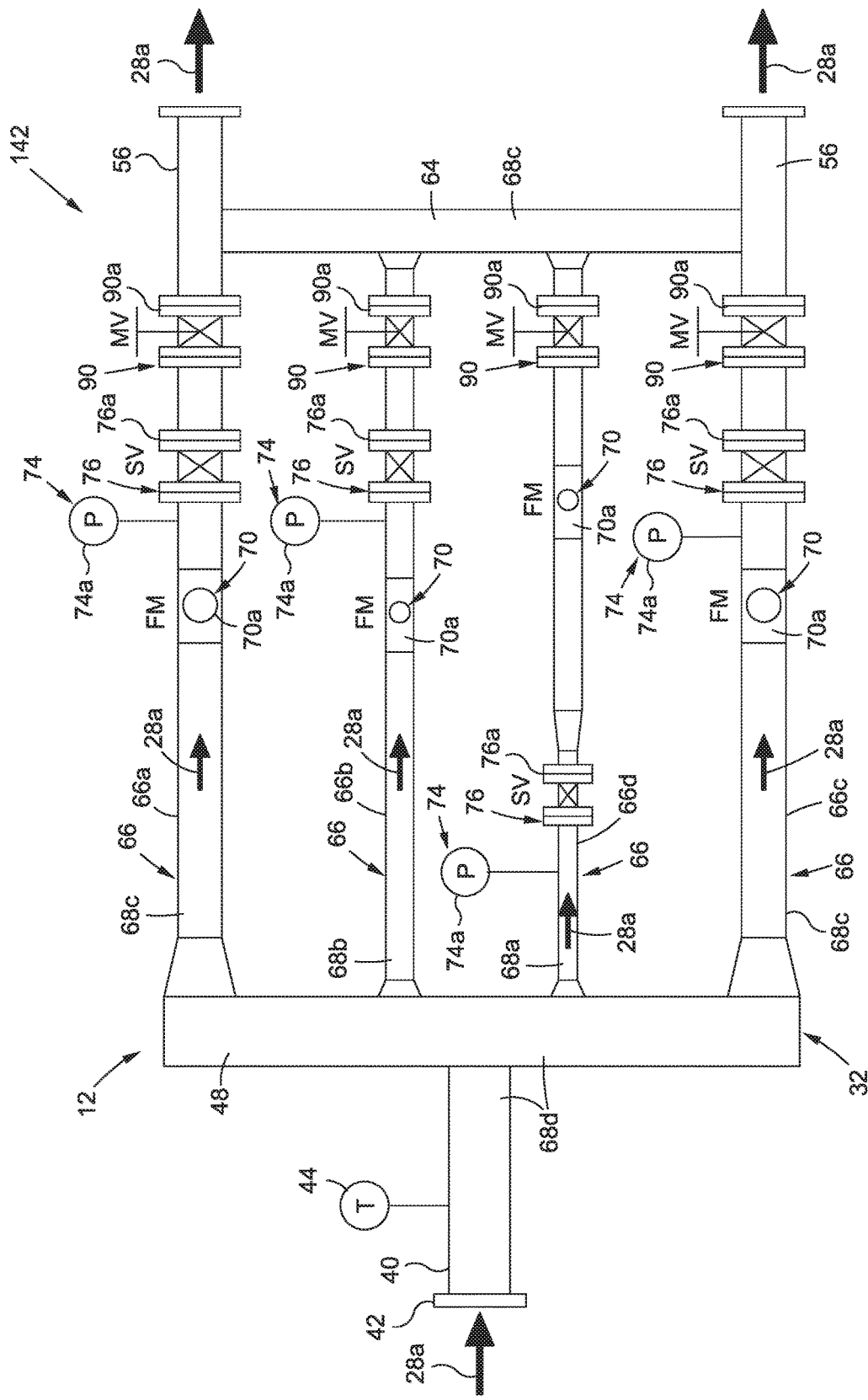
FIG. 3 is a schematic diagram of a top view of an exemplary embodiment of an instrumentation configuration of a receiver surge test tool (STT) of a receiver surge test tool (STT) assembly of the disclosure.

Now referring to FIG. 3, FIG. 3 is a schematic diagram of a top view of an exemplary embodiment of an instrumentation configuration 142 of the receiver surge test tool (STT) 12 of the receiver surge test tool (STT) assembly 10 (see FIG. 1) of the disclosure. As shown in FIG. 3, the instrumentation configuration 142 includes the pipe manifold structure 32 having the inlet port 40 with the rotatable flange 42, the temperature probe 44 coupled to the inlet port 40, and the inlet manifold 48 coupled to the inlet port 40. In this instrumentation configuration 142 (see FIG. 3), the inlet port 40 (see FIG. 3) and the inlet manifold 48 (see FIG. 3) both have a six-inch diameter 68*d* (see FIG. 3).

As further shown in FIG. 3, the pipe manifold structure 32 comprises four (4) flow lines 66, including line 1 66*a* having a four-inch diameter 68*c*, line 2 66*b* having a two-inch diameter 68*b*, line 3 66*c* having a four-inch diameter 68*c*, and line 4 66*d* having a one-inch diameter 68*a*, and further comprises the outlet manifold 64 and two outlet ports 56. In this instrumentation configuration 142 (see FIG. 3), the outlet ports 56 (see FIG. 3) and the outlet manifold 64 (see FIG. 3) both have a four-inch diameter 68*c* (see FIG. 3). As further shown in FIG. 3, the instrumentation configuration 142 comprises the each flow line 66 having the flow meter 70, such as the ultrasonic flow meter 70*a*, the pressure transducer 74, such as the dynamic pressure transducer 74*a*, the shutoff valve 76, such as the pneumatically actuated ball valve 76*a*, and the manual back pressure valve 90, such as the manual butterfly valve 90*a*.

As discussed above, the temperature probe 44 (see FIG. 3) is used to measure or record the temperature 46 (see FIG. 1) of the fuel flow 28*a* (see FIG. 3) flowing into the receiver STT 12 (see FIG. 3). The flow meters 70 (see FIG. 3), such as the ultrasonic flow meters 70*a* (see FIG. 3), are used to measure the volumetric flow rate 73 (see FIG. 1) of the fuel flow 28*a* (see FIG. 3) flowing through the flow lines 66 (see FIG. 3). The pressure transducers 74 (see FIG. 3), such as the dynamic pressure transducers 74*a* (see FIG. 3), are used to measure the surge pressure 26 (see FIG. 1) of the fuel flow 28*a* (see FIG. 3) flowing through the flow lines 66 (see FIG. 3). The manual back pressure valves 90 (see FIG. 3), such as the manual butterfly valves 90*a* (see FIG. 3), are used for adjusting back pressure 92 (see FIG. 1) and creating different back pressures 92 (see FIG. 1) that simulate different receiver aircraft 24 (see FIG. 1). Opening the manual back pressure valve 90 (see FIG. 3) decreases the back pressure 92 (see FIG. 1), and closing the manual back pressure valve 90 (see FIG. 3) increases the back pressure 92 (see FIG. 1).

As shown in FIG. 3, the fuel flow 28*a* enters the inlet port 40, flows past the temperature probe 44, flows through the inlet manifold 48, through each flow line 66 past the flow meter 70, past the pressure transducer 74, past the shutoff valve 76, and past the manual back pressure valve 90, flows through the outlet manifold 64, and flows out the outlet ports 56. The receiver STT 12 (see FIG. 3) is instrumented to record the results of the pressure surges experienced when one of the shutoff valves 76 (see FIG. 3), such as the pneumatically actuated ball valve 76*a* (see FIG. 3), is closed, as the fuel flow 28*a* (see FIG. 3) flows through it.

Figure 4A:
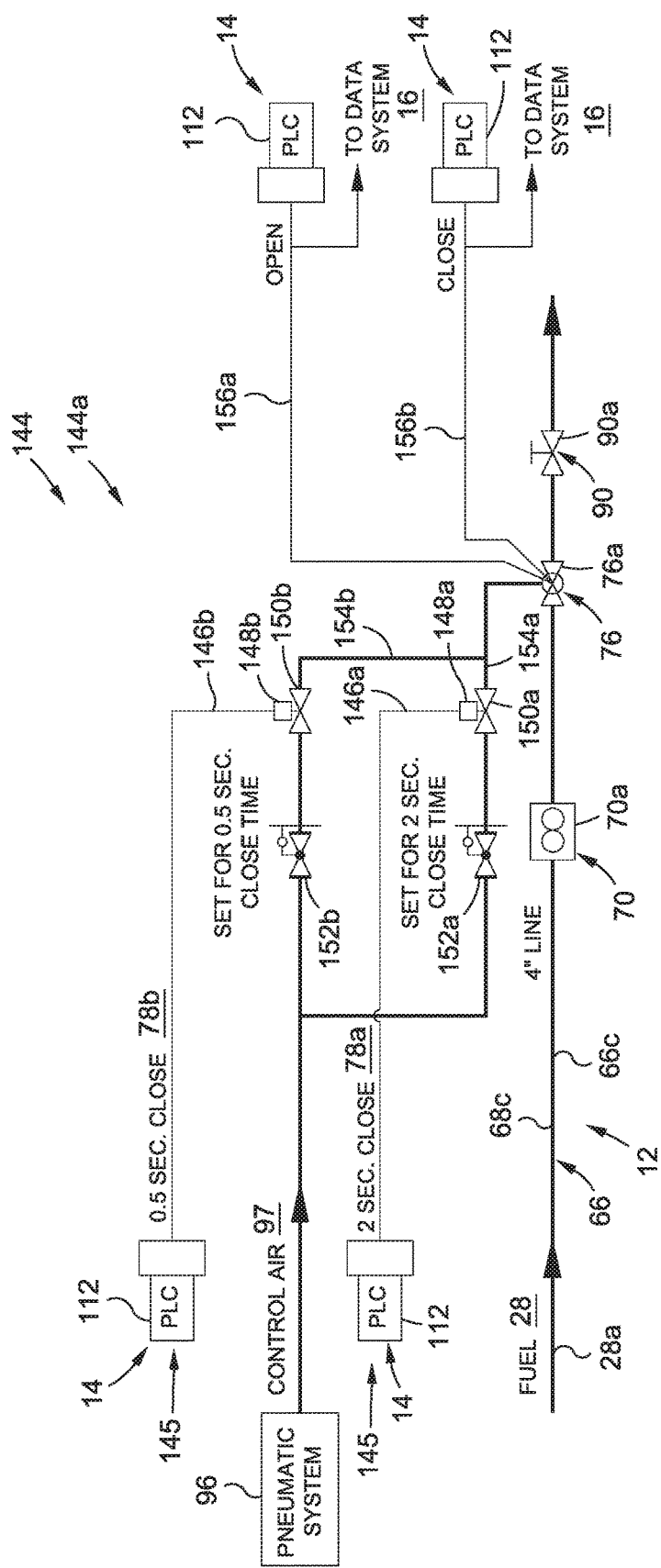
FIG. 4A is a schematic diagram of an embodiment of a receiver surge test tool (STT) dual rate valve control system for a receiver surge test tool (STT) of a receiver surge test tool (STT) assembly of the disclosure.

Now referring to FIG. 4A, FIG. 4A is a schematic diagram of an embodiment of a receiver surge test tool (STT) dual rate valve control system 144, such as in the form of a pneumatic receiver surge test tool (STT) dual rate valve control system 144*a*, for the receiver STT 12 of the receiver STT assembly 10 (see FIG. 1) of the disclosure. FIG. 4A shows the receiver STT dual rate valve control system 144, such as in the form of pneumatic receiver STT dual rate valve control system 144*a*, connected to one flow line 66 of the receiver STT 12, for example, line 3 66*c*, having the four-inch diameter 68*c*, and having the flow meter 70, such as the ultrasonic flow meter 70*a*, the shutoff valve 76, such as the pneumatically actuated ball valve 76*a*, and the manual back pressure valve 90, such as the manual butterfly valve 90*a*, all coupled to the flow line 66.

FIG. 4A further shows the 2 second valve close rate 78*a* (+/−0.1 second), and the 0.5 second valve close rate 78*b* (+/−0.1 second), for closing the shutoff valve 76, such as the pneumatically actuated ball valve 76*a*, thus providing a dual rate 145 of closure of the shutoff valve 76 for each flow line 66. As shown in FIG. 4A, the 2 second valve close rate 78*a* (+/−0.1 second), and the 0.5 second valve close rate 78*b* (+/−0.1 second), are each controlled by the programmable logic controller (PLC) 112 of the control system 14, and the 2 second valve close rate 78*a* (+/−0.1 second), results in a control output 146*a*, and the 0.5 second valve close rate 78*b* (+/−0.1 second), results in a control output 146*b*. The control outputs 146*a*, 146*b* (see FIG. 4A) control solenoids 148*a*, 148*b* (see FIG. 4A), respectively, which are coupled to selector valves 150a, 150b (see FIG. 4A), respectively. As shown in FIG. 4A, the solenoids 148a, 148b and selector valves 150a, 150b, are inline with pressure reducing valves 152a, 152b, respectively. In this embodiment, as shown in FIG. 4A, the pressure reducing valve 152a is set to achieve the 2 second valve close rate 78a (+/−0.1 second), of the shutoff valve 76, and the pressure reducing valve 152b is set to achieve the 0.5 second valve close rate 78b (+/−0.1 second), of the shutoff valve 76.

As shown in FIG. 4A, the pneumatic system 96 controls air 97 flowing to the pressure reducing valves 152a, 152b, to change the position of the shutoff valve 76, so that one of the selector valves 150a, 150b is opened for the desired speed, and the other selector valve 150a, 150b is closed for the speed not wanted. Actuation close speed signals 154a, 154b (see FIG. 4A) energize the shutoff valve 76 (see FIG. 4A) to close at the respective 2 second valve close rate 78a (+/−0.1 second) (see FIG. 4A), or 0.5 second valve close rate 78b (+/−0.1 second) (see FIG. 4A).

As further shown in FIG. 4A, the receiver STT dual rate valve control system 144, such as in the form of pneumatic receiver STT dual rate valve control system 144a, allows a user to command an open position 156a of the shutoff valve 76, to the PLC 112 of the control system 14, and to the data system 16. As further shown in FIG. 4A, the receiver STT dual rate valve control system 144, such as in the form of pneumatic receiver STT dual rate valve control system 144a, allows a user to command a close position 156b of the shutoff valve 76, to the PLC 112 of the control system 14, and to the data system 16.

Figure 4B:
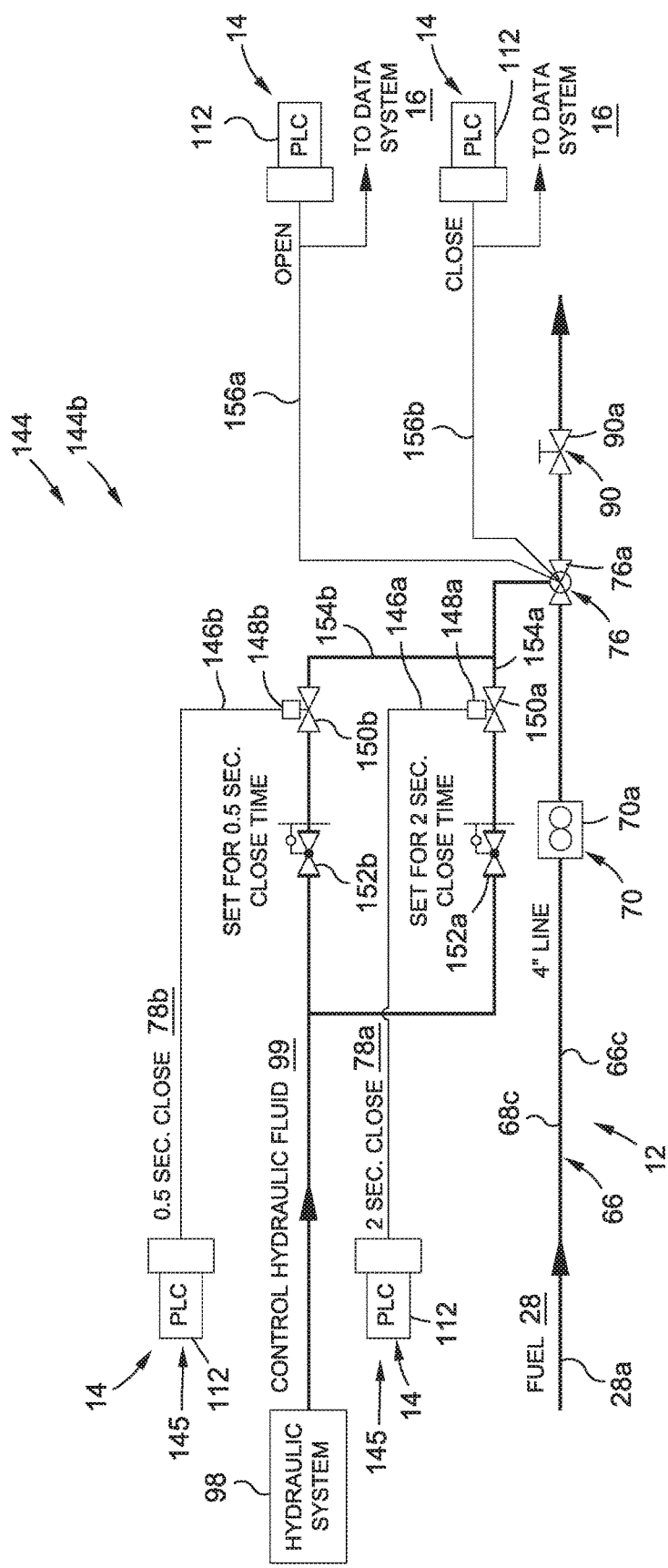
FIG. 4B is a schematic diagram of another embodiment of a receiver surge test tool (STT) dual rate valve control system for a receiver surge test tool (STT) of a receiver surge test tool (STT) assembly of the disclosure.

Now referring to FIG. 4B, FIG. 4B is a schematic diagram of another embodiment of a receiver surge test tool (STT) dual rate valve control system 144, such as in the form of a hydraulic receiver surge test tool (STT) dual rate valve control system 144b, for the receiver STT 12 of the receiver STT assembly 10 (see FIG. 1) of the disclosure. FIG. 4B shows the receiver STT dual rate valve control system 144, such as in the form of hydraulic receiver STT dual rate valve control system 144b, connected to one flow line 66 of the receiver STT 12, for example, line 3 66c, having the four-inch diameter 68c, and having the flow meter 70, such as the ultrasonic flow meter 70a, the shutoff valve 76, such as the pneumatically actuated ball valve 76a, and the manual back pressure valve 90, such as the manual butterfly valve 90a, all coupled to the flow line 66.

FIG. 4B further shows the 2 second valve close rate 78a (+/−0.1 second), and the 0.5 second valve close rate 78b (+/−0.1 second), for closing the shutoff valve 76, such as the pneumatically actuated ball valve 76a, thus providing the dual rate 145 of closure for the shutoff valve 76 for each flow line 66. As shown in FIG. 4B, similar to FIG. 4A, the 2 second valve close rate 78a (+/−0.1 second), and the 0.5 second valve close rate 78b (+/−0.1 second), are each controlled by the programmable logic controller (PLC) 112 of the control system 14, and the 2 second valve close rate 78a (+/−0.1 second), results in the control output 146a, and the 0.5 second valve close rate 78b (+/−0.1 second), results in the control output 146b. The control outputs 146a, 146b (see FIG. 4A) control solenoids 148a, 148b (see FIG. 4A), respectively, which are coupled to selector valves 150a, 150b (see FIG. 4A), respectively. As shown in FIG. 4B, the solenoids 148a, 148b and selector valves 150a, 150b, are inline with pressure reducing valves 152a, 152b, respectively. In this embodiment, as shown in FIG. 4B, pressure reducing valve 152a is set to achieve the 2 second valve close rate 78a (+/−0.1 second), of the shutoff valve 76, and the pressure reducing valve 152b is set to achieve the 0.5 second valve close rate 78b (+/−0.1 second), of the shutoff valve 76.

As shown in FIG. 4B, the hydraulic system 98 controls the hydraulic fluid 99 flowing to the pressure reducing valves 152a, 152b, to change the position of the shutoff valve 76, so that one of the selector valves 150a, 150b is opened for the desired speed, and the other selector valve 150a, 150b is closed for the speed not wanted. Actuation close speed signals 154a, 154b (see FIG. 4B) energize the shutoff valve 76 (see FIG. 4B) to close at the respective 2 second valve close rate 78a (+/−0.1 second) (see FIG. 4B), or 0.5 second valve close rate 78b (+/−0.1 second) (see FIG. 4B).

As further shown in FIG. 4B, the receiver STT dual rate valve control system 144, such as in the form of hydraulic receiver STT dual rate valve control system 144b, allows a user to command the open position 156a of the shutoff valve 76, to the PLC 112 of the control system 14, and to the data system 16. As further shown in FIG. 4B, the receiver STT dual rate valve control system 144, such as in the form of hydraulic receiver STT dual rate valve control system 144b, allows a user to command the close position 156b of the shutoff valve 76, to the PLC 112 of the control system 14, and to the data system 16.

In another embodiment, the receiver STT dual rate valve control system 144 may be used with an electrical system 100 (see FIG. 1). The electrical system 100 (see FIG. 1) uses electrical energy 101 (see FIG. 1) to energize the shutoff valve 76 (see FIG. 1) to close at the desired speed 80 (see FIG. 1), such as the low speed 80a (see FIG. 1), for example, the 2 second valve close rate 78a (+/−0.1 second) (see FIG. 5), or the high speed 80b (see FIG. 1), for example, the 0.5 second valve close rate 78b (+/−0.1 second) (see FIG. 5).

Figure 5:
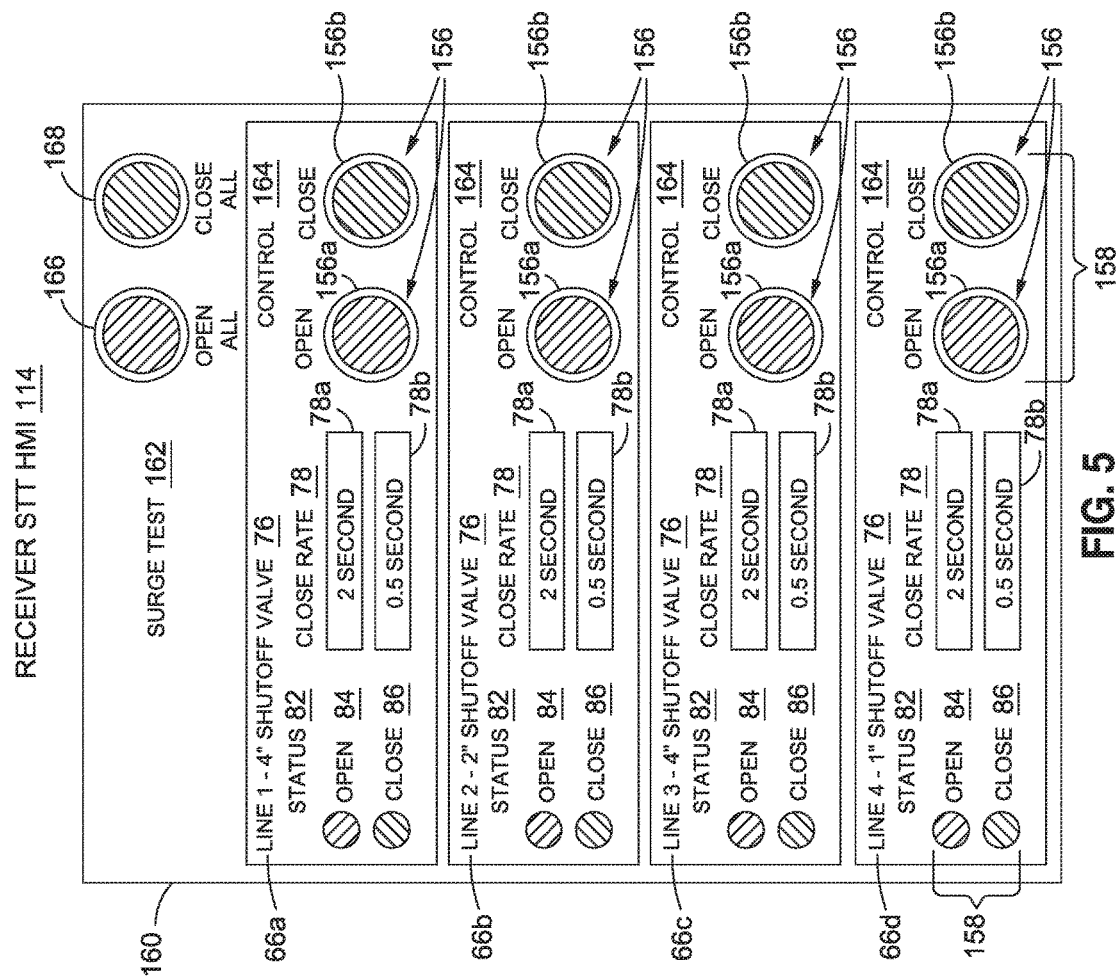
FIG. 5 is an illustration of a front view of an exemplary receiver surge test tool (STT) human-machine interface (HMI) that may be used in embodiments of the receiver surge test tool (STT) assembly, system, and method of the disclosure.

Now referring to FIG. 5, FIG. 5 is an illustration of a front view of an exemplary receiver surge test tool (STT) human-machine interface (HMI) 114 that may be used in embodiments of the receiver STT assembly 10 (see FIG. 1), the receiver surge test tool (STT) system 170 (see FIG. 6), and method 250 (see FIG. 10) of the disclosure. As shown in FIG. 5, the receiver STT HMI 114 comprises a control system unit (CSU) receiver surge test tool (STT) dual rate valve control panel 160 for a surge test 162. The CSU receiver STT dual rate valve control panel 160 (see FIG. 5) is preferably used to operate the shutoff valve 76 (see FIG. 5) for each flow line 66 (see FIG. 1) of the receiver STT 12 (see FIG. 1), such as line 1 66a (see FIG. 5), line 2 66b (see FIG. 5), line 3 66c (see FIG. 5), and line 4 66d (see FIG. 5).

As shown in FIG. 5, the CSU receiver STT dual rate valve control panel 160 includes a status button 82 for each shutoff valve 76, including an "OPEN" status 84 and a "CLOSE" status 86, and indicates the valve close rate 78 of the 2 second valve close rate 78a (+/−0.1 second), and the 0.5 second valve close rate 78b (+/−0.1 second). Although the valve close rates 78 (see FIG. 5) are indicated on the CSU receiver STT dual rate valve control panel 160 (see FIG. 5), they are preferably manually set as they may not be set using the control system unit (CSU) 110 (see FIG. 1).

As further shown in FIG. 5, the CSU receiver STT dual rate valve control panel 160 includes control buttons 164 to open and close the shutoff valves 76, as needed, and command valve positions. Valve position indicators 156 (see FIG. 5) include the open position 156a (see FIG. 5) and the close position 156b (see FIG. 5). The CSU receiver STT dual rate valve control panel 160 (see FIG. 5) provides for a dual set of open and close limit switches 158 on each shutoff valve 76, one set for the control system 14 (see FIGS. 1, 4A-4B) and one set for the data system 16 (see FIGS. 1, 4A-4B).

As further shown in FIG. 5, the CSU receiver STT dual rate valve control panel 160 includes an "OPEN ALL" button 166 and a "CLOSE ALL" button 168. The "OPEN ALL" button 166 (see FIG. 5) and the "CLOSE ALL" button 168 (see FIG. 5) allow a user to open or close all the shutoff valves 76 (see FIG. 5) simultaneously.

A typical operation of the CSU receiver STT dual rate valve control panel 160 may include selecting the valve close rates 78 (see FIG. 5), selecting the open position 156a (see FIG. 5) for shutoff valves 76 to be used for the surge test 162 (see FIG. 5), and selecting the "CLOSE ALL" button 168 to simultaneously close the shutoff valves 76 (see FIG. 5) to initiate the surge test 162 (see FIG. 5).

To initiate the surge test 162 (see FIG. 5), the "CLOSE ALL" button 168 (see FIG. 5) may be selected to simultaneously close all of the shutoff valves 76 (see FIG. 5). At the end of the surge test 162 (see FIG. 5), the "CLOSE ALL" button 168 (see FIG. 5) may be used to ensure that all of the shutoff valves 76 (see FIG. 5) are returned to the close position 156b (see FIG. 5).

Figure 7:
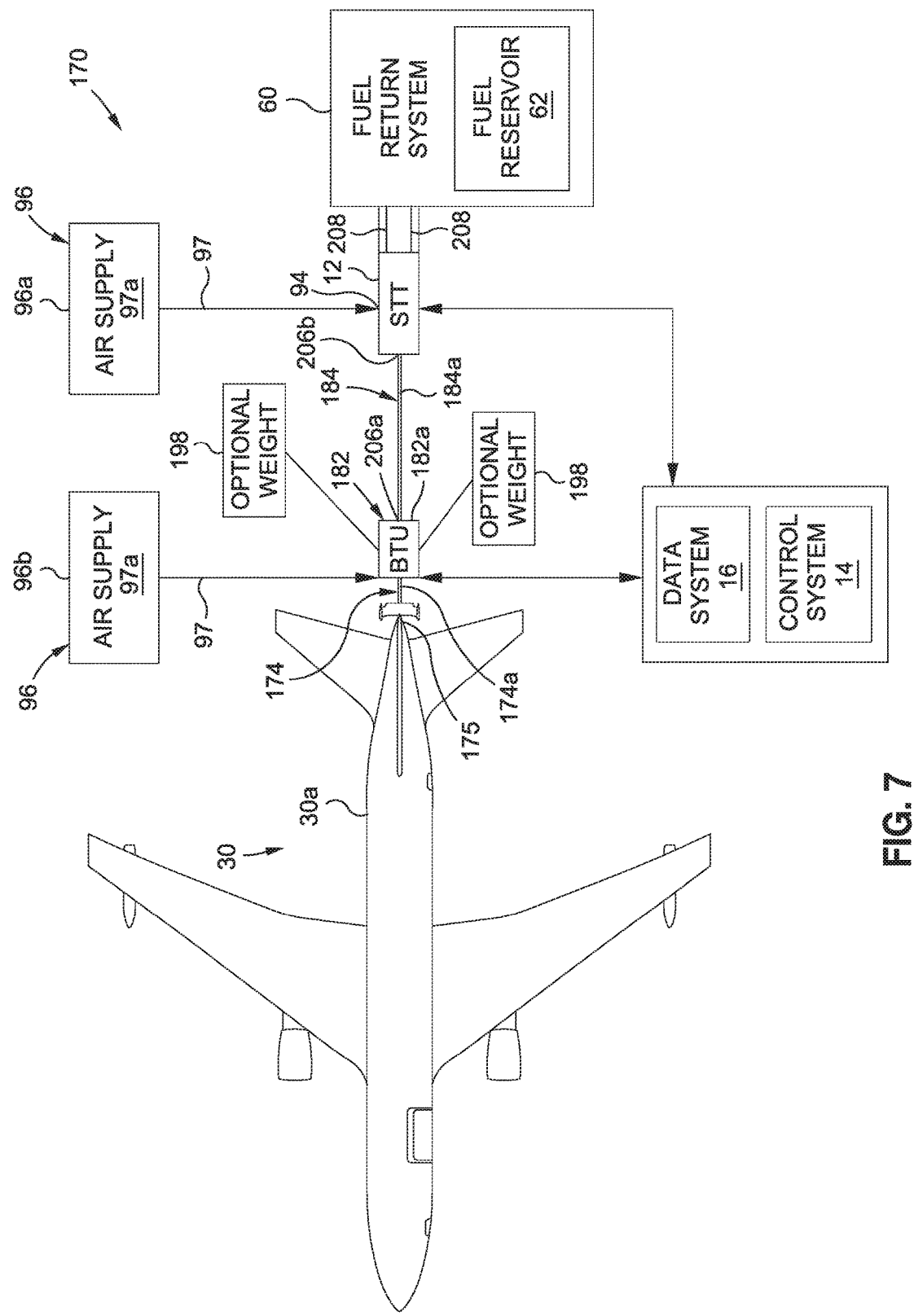
FIG. 7 is a schematic diagram of a top view of an exemplary embodiment of a receiver surge test tool (STT) system of the disclosure.
Figure 8:
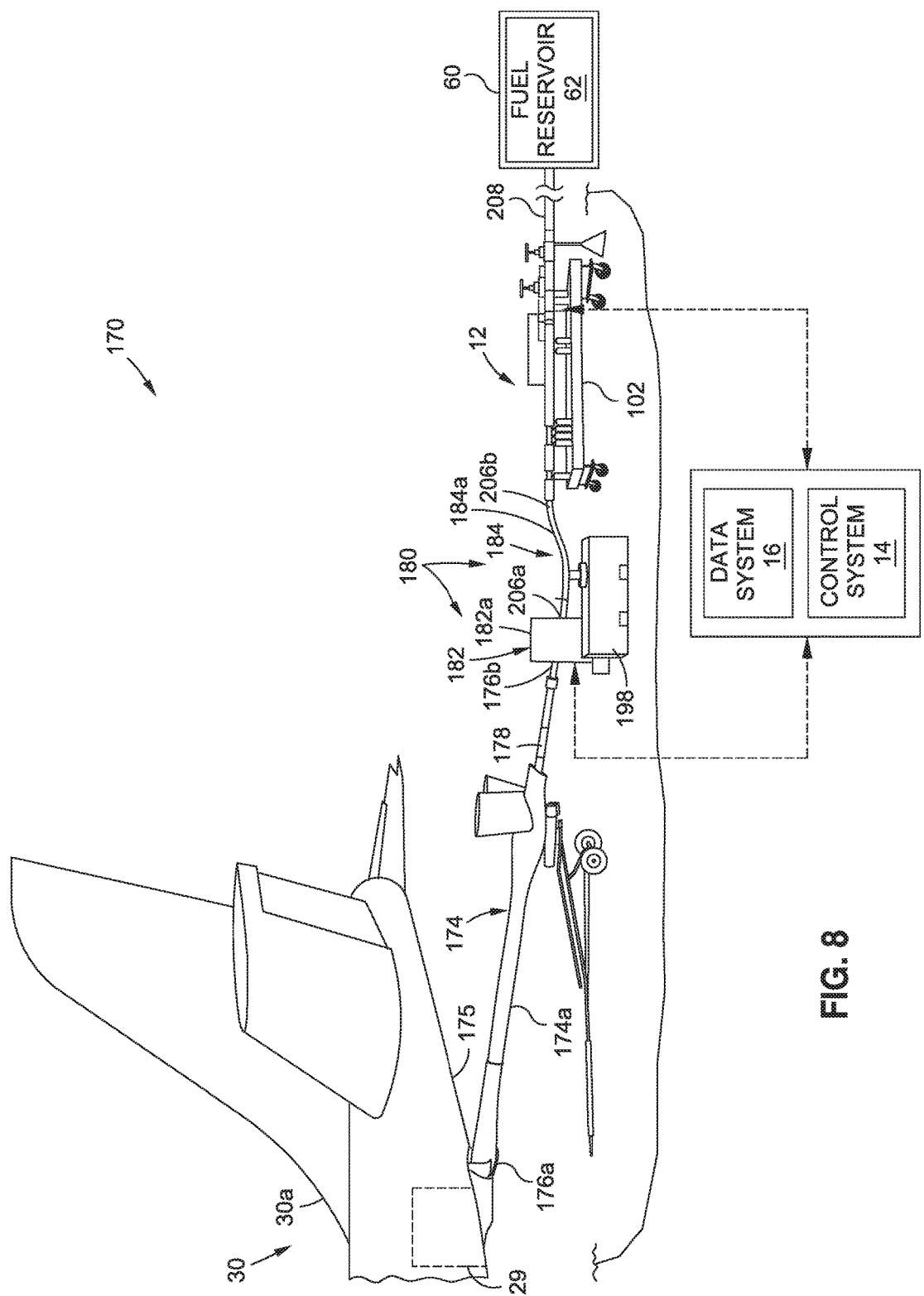
FIG. 8 is an illustration of a side perspective view of an exemplary embodiment of a receiver surge test tool (STT) system of the disclosure.

Now referring to FIG. 6-8, in another embodiment, there is provided a receiver surge test tool (STT) system 170 of the disclosure that is used for receiver surge pressure testing 18. FIG. 6 is an illustration of a functional block diagram of an exemplary embodiment of the receiver STT system 170 of the disclosure. FIG. 7 is a schematic diagram of a top view of an exemplary embodiment of the receiver STT system 170 of the disclosure. FIG. 8 is an illustration of a side perspective view of an exemplary embodiment of the receiver STT system 170 of the disclosure.

As shown in FIGS. 6-8, the receiver STT system 170 comprises the refueling source 30, such as in the form of the refueling tanker aircraft 30a. The refueling tanker aircraft 30a (see FIG. 6) comprises the uncertified refueling tanker aircraft 30b (see FIG. 6) or the certified refueling tanker aircraft 30c (see FIG. 6). The refueling source 30 (see FIG. 6) may also comprise a refueling truck 30d (see FIG. 6), a hydrant system 30e (see FIG. 6), a hose cart 30f (see FIG. 6), or another suitable refueling source 30 (see FIG. 6).

As shown in FIGS. 6 and 8, the refueling source 30, such as in the form of refueling tanker aircraft 30a, has a supply 29 of fuel 28 (see FIG. 6). The refueling source 30 (see FIG. 6), such as in the form of refueling tanker aircraft 30a (see FIG. 6), preferably has one or more fuel pumps 172 (see FIG. 6) configured to initiate the fuel flow 28a (see FIG. 6) of the fuel 28 (see FIG. 6) out of the refueling source 30 (see FIG. 6) and through an elongated refueling tube 174 (see FIGS. 6-8) coupled to the refueling source 30 (see FIGS. 6-8).

As shown in FIGS. 6-8, the refueling tube 174 may be in the form of an aircraft boom 174a attached to a tail portion 175 (see FIGS. 7-8) of the refueling source 30, such as in the form of refueling tanker aircraft 30a. As shown in FIG. 8, the elongated refueling tube 174, such as in the form of aircraft boom 174a, has a first end 176a coupled or attached to the tail portion 175 of the refueling tanker aircraft 30a, has a second end 176b coupled or attached to an adapter assembly 180, and has an elongated body 178 disposed between the first end 176a and the second end 176b. The elongated refueling tube 174 (see FIGS. 6-8) may also be in the form of a flexible hose or flexible tube, or another suitable apparatus for transporting fuel 28 (see FIG. 6) from the refueling source 30 (see FIG. 6) to an adapter assembly 180 (see FIGS. 6, 8).

The receiver STT system 170 (see FIGS. 6-8) further comprises the adapter assembly 180 (see FIGS. 6, 8) having a first portion 182 (see FIGS. 6-8) connected to the elongated refueling tube 174 (see FIGS. 6-8) and having a second portion 184 (see FIGS. 6-8). The adapter assembly 180 (see FIGS. 6, 8) is configured to receive the fuel flow 28a (see FIG. 6) of fuel 28 (see FIG. 6) from the elongated refueling tube 174 (see FIGS. 6-8) into the first portion 182 (see FIGS. 6-8), and is configured to move the fuel flow 28a (see FIG. 6) of fuel 28 (see FIG. 6) from the first portion 182 (see FIGS. 6-8) to the second portion 184 (see FIGS. 6-8). As shown in FIGS. 6-8, the first portion 182 may comprise a boom test unit (BTU) 182a, or another suitable adapter apparatus for receiving fuel 28 (see FIG. 6) from the refueling source 30 (see FIG. 6).

Figure 9A:
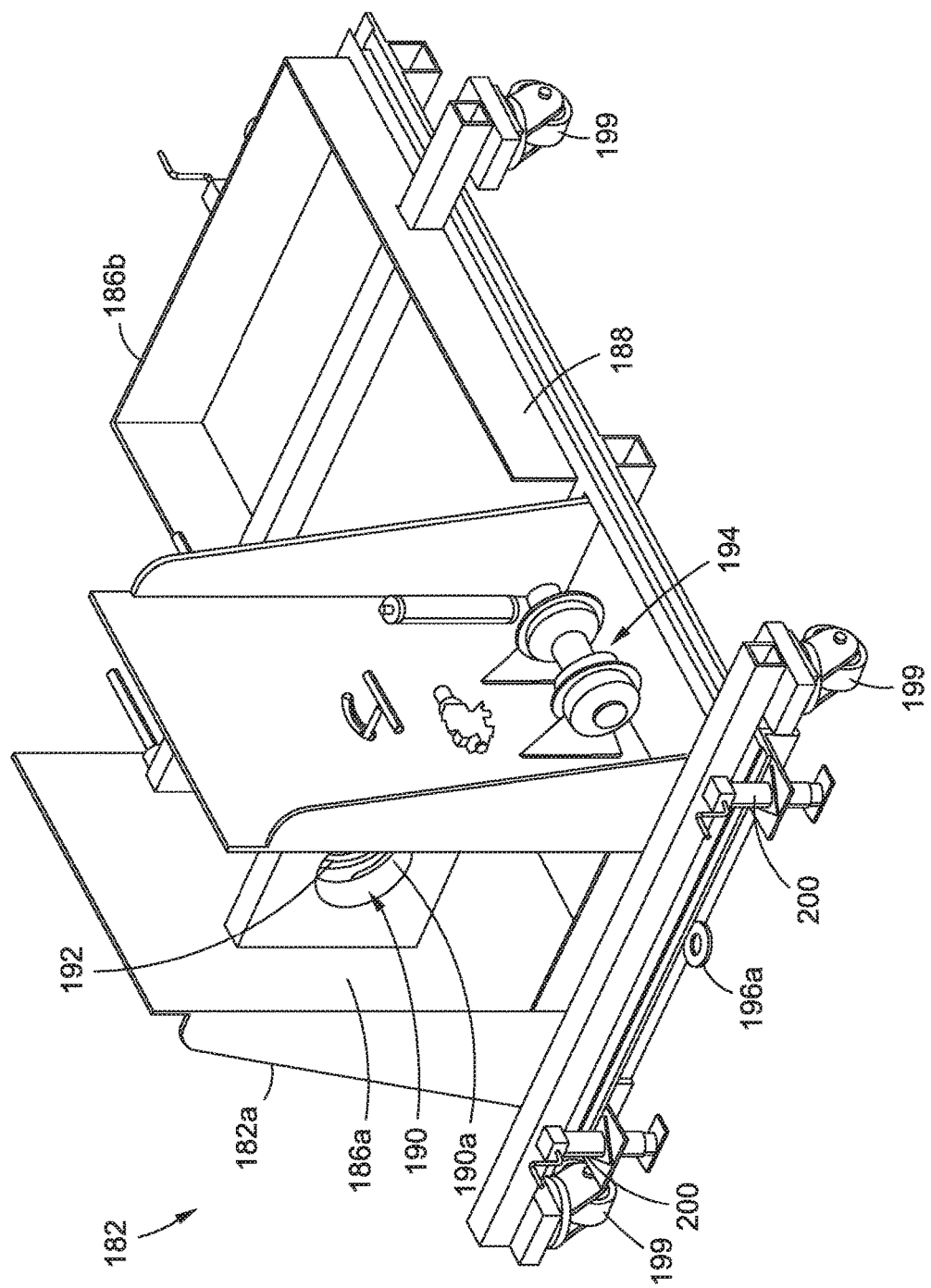
FIG. 9A is an illustration of a front perspective view of an exemplary embodiment of a boom test unit (BTU) that may be used in embodiments of a receiver surge test tool (STT) system and method of the disclosure.

Now referring to FIG. 9A, FIG. 9A is an illustration of a front perspective view of an exemplary embodiment of the boom test unit (BTU) 182a that may be used in embodiments of the receiver STT system 170 (see FIG. 6) and method 250 (see FIG. 10) of the disclosure. As shown in FIG. 9A, the first portion 182 comprises the BTU 182a having a first end 186a, a second end 186b, and a frame body 188 disposed between the first end 186a and the second end 186b.

As further shown in FIG. 9A, the first end 186a of the BTU 182a comprises a BTU inlet 190, such as in the form of the receptacle 190a (see also FIG. 6). The receptacle 190a (see FIG. 9A) includes a hydraulic actuator 192 (see FIG. 9A) coupled to a hydraulic system 194, which is configured to actuate the hydraulic actuator 192. The BTU inlet 190 (see FIG. 9A), such as in the form of the receptacle 190a (see FIG. 9A), is configured to receive the second end 176b (see FIG. 8) of the elongated refueling tube 174 (see FIG. 8), such as aircraft boom 174a (see FIG. 8).

As further shown in FIG. 9A, the BTU 182a comprises attach points 196a, 196b, for attachment to one or more optional weights 198 (see FIG. 7) to facilitate securement of the BTU 182a in place at the location of the receiver surge pressure testing 18 (see FIG. 6). As further shown in FIG. 9A, the BTU 182a is preferably mobile to enable movement to the location of the receiver surge pressure testing 18 (see FIG. 6), and preferably has a plurality of wheels 199 to allow movement of the BTU 182a, and a plurality of jack devices 200 to allow securement of the BTU 182a in place, and to allow adjustment of the positioning and angle of the BTU 182a to connect with the elongated refueling tube 174 (see FIG. 8), such as the aircraft boom 174a (see FIG. 8).

Figure 9B:
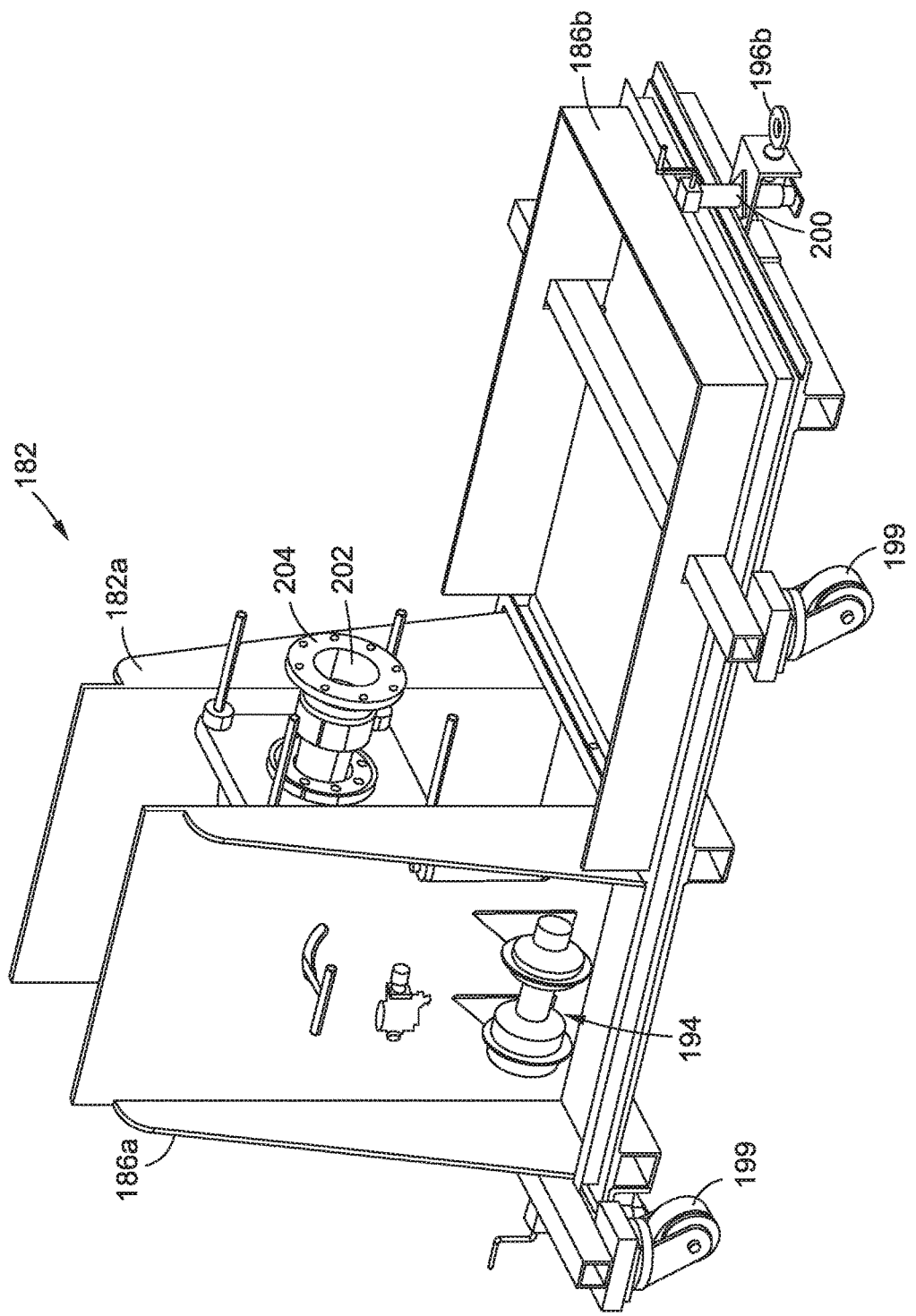
FIG. 9B is an illustration of a back perspective view of the boom test unit (BTU) of FIG. 9A.

Now referring to FIG. 9B, FIG. 9B is an illustration of a back perspective view of the first portion 182, such as in the form of the BTU 182a, of FIG. 9A. FIG. 9B shows the first end 186a, the second end 186b, the hydraulic system 194, the attach point 196b for one or more optional weights 198 (see FIG. 7), wheels 199, and jack devices 200. As further shown in FIG. 9B, the BTU 182a comprises a boom test unit (BTU) outlet 202 having an outlet flange 204. The BTU outlet 202 (see FIG. 9B) is configured to connect or attach to the second portion 184 (see FIGS. 7-8).

The second portion 184 (see FIGS. 6-8) of the adapter assembly 180 (see FIGS. 6, 8) may be in the form of a connector hose 184a (see FIGS. 6-8), such as a six (6) inch diameter flexible hose, or another suitable connector adapter apparatus for receiving fuel 28 (see FIG. 6) from the first portion 182 (see FIGS. 6-8), such as in the form of BTU 182a (see FIGS. 6-8). The second portion 184 (see FIGS. 7-8), such as in the form of connector hose 184a (see FIGS. 7-8), has a first end 206a (see FIGS. 7-8) coupled or attached to the first portion 182 (see FIGS. 7-8), such as in the form of BTU 182*a* (see FIGS. 7-8). In particular, the first end 206*a* (see FIGS. 7-8) is coupled or attached to the BTU outlet 202 (see FIG. 9B) of the BTU 182*a* (see FIGS. 7-8, 9B). The second portion 184 (see FIGS. 7-8), such as in the form of connector hose 184*a* (see FIGS. 7-8), has a second end 206*b* (see FIGS. 7-8) coupled or attached to the receiver STT 12 (see FIGS. 7-8). In particular, the second end 206*b* (see FIGS. 7-8) is coupled or attached to the inlet port 40 (see FIGS. 2A-2D, 6) of the receiver STT 12 (see FIGS. 2A-2D, 6-8).

The receiver STT system 170 (see FIG. 6) further comprises the receiver STT assembly 10 (see FIGS. 1, 2A, 6) with the receiver STT 12 (see FIGS. 1, 2A, 6), discussed in detail above. As shown in FIGS. 7-8, the receiver STT 12 is coupled to the second portion 184 of the adapter assembly 180. The receiver STT 12 (see FIGS. 6-8) is configured to simulate surge pressure conditions 20 (see FIG. 6) of the receiver apparatus 23 (see FIG. 6), such as the receiver aircraft 24 (see FIG. 6). The receiver STT 12 (see FIGS. 6-8) functions as a simulated receiver aircraft 24*a* (see FIG. 6). The receiver STT 12 (see FIG. 6-8) is further configured to measure one or more surge pressures 26 (see FIG. 6) generated when receiving the fuel flow 28*a* (see FIG. 6) during the receiver surge pressure testing 18 (see FIG. 6) that is ground based.

As discussed above, the receiver STT assembly 10 (see FIGS. 1, 2A, 6) comprises the receiver STT 12 (see FIGS. 1, 2A, 6) with the pipe manifold structure 32 (see FIGS. 1, 2A, 6) having the inlet port 40 (see FIGS. 1, 2A, 6) configured to receive the fuel flow 28*a* (see FIGS. 1, 6) from the adapter assembly 180 (see FIG. 6), having the one or more outlet ports 56 (see FIGS. 1, 2A, 6), and having the one or more flow lines 66 (see FIGS. 1, 2A, 6) disposed between the inlet port 40 (see FIGS. 1, 2A, 6) and the one or more outlet ports 56 (see FIGS. 1, 2A, 6). Each flow line 66 (see FIGS. 1, 2A, 6) is configured to move the fuel flow 28*a* (see FIG. 6) from the inlet port 40 (see FIGS. 1, 2A, 6) to the one or more outlet ports 56 (see FIGS. 1, 2A, 6). As discussed above, each flow line 66 (see FIGS. 1, 6) comprises the flow meter 70 (see FIG. 1), the pressure transducer 74 (see FIG. 1), the shutoff valve 76 (see FIG. 1) having varying valve close rates 78 (see FIG. 1) and having two sets of valve position indicators 156 (see FIG. 1) for indicating the open position 156*a* (see FIGS. 1, 5) and the close position 156*b* (see FIGS. 1, 5), and the manual back pressure valve 90 (see FIG. 1).

As further discussed above, the flow meter 70 (see FIGS. 1, 2A) preferably comprises the ultrasonic flow meter 70*a* (see FIGS. 1, 2A) for measuring volumetric flow rate 73 (see FIG. 1) of the fuel flow 28*a* (see FIGS. 1, 6); the pressure transducer 74 (see FIGS. 1, 2A) preferably comprises the dynamic pressure transducer 74*a* (see FIGS. 1, 2A) for measuring the surge pressure 26 (see FIGS. 1, 6) of the fuel flow 28*a* (see FIGS. 1, 6); the shutoff valve 76 (see FIGS. 1, 2A) preferably comprises the pneumatically actuated ball valve 76*a* (see FIGS. 1, 2A) having two regulated air flow paths 88 (see FIG. 1) set to cause valve close rates 78 (see FIGS. 1, 5) comprising one of the 2 second valve close rate 78*a* (see FIG. 5) and the 0.5 second valve close rate 78*b* (see FIG. 5); and the manual back pressure valve 90 (see FIGS. 1, 2A) preferably comprises the manual butterfly valve 90*a* (see FIGS. 1, 2A) for creating back pressures 92 (see FIG. 1) that simulate different receiver aircraft 24 (see FIGS. 1, 6).

Once the receiver STT system 170 (see FIGS. 6-8) is set up, the refueling source 30 (see FIGS. 6-8), such as the refueling tanker aircraft 30*a* (see FIGS. 6-8), can begin offloading fuel 28 (see FIG. 6) through the aircraft boom 174*a* (see FIGS. 6-8), and through one flow line 66 (see FIG. 6) with the shutoff valve 76 (see FIG. 2A) open, or through both four-inch diameter 68*c* flow lines 66*a*, 66*c* (see FIG. 2A) with the shutoff valves 76 (see FIG. 2A) open. The shutoff valves 76 (see FIGS. 1, 2A) on the other flow lines 66 (see FIGS. 1, 2A) remain closed. The manual back pressure valves 90 (see FIGS. 1, 2A) may then be adjusted to achieve the desired back pressure. Once the offload pressure and flow rate stabilize, the shutoff valve 76 (see FIGS. 1, 2A), such as the pneumatically actuated ball valve 76*a* (see FIGS. 1, 2A), on the flow line 66 (see FIGS. 1, 2A) that is active on the receiver STT 12 (see FIGS. 1, 2A) will be closed, creating a surge pressure 26 (see FIGS. 1, 6). Each shutoff valve 76 (see FIGS. 1, 2A), such as the pneumatically actuated ball valve 76*a* (see FIGS. 1, 2A), has two different regulated air paths 88 (see FIG. 1), which may be set to cause valve close rates 78 (see FIGS. 1, 5) of the 2 second valve close rate 78*a* (see FIG. 5) or the 0.5 second valve close rate 78*b* (see FIG. 5).

The receiver STT 12 (see FIG. 6) of the receiver STT system 170 (see FIG. 6) comprises the temperature probe 44 (see FIG. 6), such as in the form of a resistance temperature detector (RTD) or another suitable temperature measuring device, coupled to the inlet port 40 (see FIG. 6) to measure the temperature 46 (see FIG. 1) of the fuel flow 28*a* (see FIG. 6) received into the inlet port 40 (see FIG. 6), and comprises one or more drive connection ports 94 (see FIGS. 1, 6, 7). As discussed above, the drive connection port 94 (see FIGS. 1, 6, 7) is configured to connect to the valve control system 95 (see FIG. 1) comprising the pneumatic system 96 (see FIGS. 1, 4A), the hydraulic system 98 (see FIGS. 1, 4B), the electrical system 100 (see FIG. 1), or another suitable valve control system 95 (see FIG. 1), to drive closure of each shutoff valve 76 (see FIG. 1).

FIG. 7 shows the drive connection port 94 of the receiver STT 12 connected to a pneumatic system 96, such as a first pneumatic system 96*a*, having an air supply 97*a* that is preferably pressurized at a desired pressure, e.g., 100 psi (pounds per square inch), or another suitable pressure. The pneumatic system 96 (see FIG. 7), such as the first pneumatic system 96*a* (see FIG. 7), provides the air supply 97*a* (see FIG. 7) to the receiver STT 12 for valve control closure of the shutoff valves 76 (see FIG. 1). FIG. 7 also shows the BTU 182*a* connected to a pneumatic system 96, such as a second pneumatic system 96*b*, having an air supply 97*a* that is preferably pressurized at a desired pressure, e.g., 100 psi (pounds per square inch), or another suitable pressure. The pneumatic system 96 (see FIG. 7), such as the second pneumatic system 96*b* (see FIG. 7), provides the air supply 97*a* (see FIG. 7) to the BTU 182*a* (see FIG. 7) for control of the receptacle 190*a* (see FIG. 9A) of the BTU 182*a* (see FIG. 7).

The receiver STT 12 (see FIG. 6) of the receiver STT system 170 (see FIG. 6) may further comprise, as discussed above, the one or more air bleed ports 50 (see FIGS. 2A, 6) coupled to the receiver STT 12 (see FIGS. 2A, 6) to prime the receiver STT 12 (see FIG. 6) prior to the receiver surge pressure testing 18 (see FIG. 6), to ensure no air is in the receiver STT 12 (see FIG. 6). The receiver STT 12 (see FIG. 6) of the receiver STT system 170 (see FIG. 6) may further comprise, as discussed above, the one or more drain ports 52 (see FIGS. 2A, 6) coupled to the receiver STT 12 (see FIGS. 2A, 6), to drain residual fuel 28*b* (see FIG. 1) out of the receiver STT 12 (see FIG. 6).

The receiver STT 12 (see FIG. 6) of the receiver STT system 170 (see FIG. 6) may further comprise, as discussed above, the mobile apparatus 102 (see FIGS. 2A, 2E, 6) coupled to the receiver STT 12 (see FIGS. 2A, 6), and the grounding reel 109 (see FIGS. 2A, 6) configured to ground the receiver STT 12 (see FIGS. 2A, 6), to prevent static buildup in the one or more flow lines 66 (see FIGS. 2A, 6) of the receiver STT 12 (see FIGS. 2A, 6).

As further shown in FIGS. 6-8, the receiver STT system 170 comprises the fuel return system 60 connected to the receiver STT 12, via one or more connection elements 208 (see FIGS. 7-8), such as in the form of flexible hoses or tubes, or another suitable connection element. In particular, each connection element 208 (see FIGS. 7-8) is preferably connected at one end to an outlet port 56 (see FIGS. 2A, 6) of the receiver STT 12 (see FIGS. 2A, 6-8) and at the other end to the fuel return system 60 (see FIGS. 6-8). The fuel return system 60 (see FIGS. 6-8) is configured to receive the fuel flow 28a (see FIG. 6) of fuel 28 (see FIG. 6) out of the receiver STT 12 (see FIGS. 6-8), and is configured to transport the fuel 28 (see FIG. 6) to a fuel reservoir 62 (see FIGS. 6-8), or another suitable fuel storage apparatus or area. Preferably, the fuel return system 60 (see FIGS. 6-8) is able to handle flow rates 72 (see FIG. 1) of the fuel 28 (see FIGS. 1, 6) of up to at least 1300 gpm (gallons per minute).

As further shown in FIGS. 6-8, the receiver STT system 170 comprises the control system 14. As shown in FIG. 7, the control system 14 is preferably coupled to the receiver STT 12 and the adapter assembly 180, for controlling the open position 156a (see FIG. 1) and the close position 156b (see FIG. 1) of each shutoff valve 76 (see FIG. 1), for controlling the receiver STT 12, and for controlling the adapter assembly 180. In one embodiment as shown in FIG. 7, the control system 14 is coupled to the BTU 182a for controlling the BTU 182a. As shown in FIG. 6, the control system 14 preferably comprises the control system unit (CSU) 110 comprising one or more programmable logic controllers (PLCs) 112, the receiver surge test tool (STT) human-machine interface (HMI) 114 (see also FIG. 5), and the boom test unit (BTU) human-machine interface (HMI) 115. The BTU HMI 115 (see FIG. 6) may include status indicators and controls that allow a user to connect and disconnect the aircraft boom 174a (see FIG. 6) to and from the BTU 182a (see FIG. 6).

As further shown in FIG. 6, the control system 14 preferably comprises the power source 116, one or more computers 118 with one or more computer processors 120, one or more control connections 122, and one or more software programs 124. The one or more software programs 124 (see FIG. 6) preferably comprise the receiver surge test tool (STT) software program 124a (see FIG. 6), the boom test unit (BTU) software program 124b (see FIG. 6), or another suitable software program 124 (see FIG. 6). The control system 14 (see FIG. 6) may further comprise boom test unit (BTU) controls 126 (see FIG. 6) for controlling the BTU 182a (see FIG. 6), and/or additional suitable controls and control features.

As further shown in FIGS. 6-8, and discussed in detail below, the receiver STT system 170 comprises the data system 16. As shown in FIG. 7, the data system 16 is preferably coupled to the receiver STT 12 and coupled to the BTU 182a, for collecting and recording data 128 (see FIG. 6), such as generated during the receiver surge pressure testing 18 (see FIG. 6).

As discussed above, the data 128 (see FIGS. 1, 6) comprises test data 130 (see FIGS. 1, 6), baseline data 136 (see FIGS. 1, 6), or other suitable data 128 (see FIGS. 1, 6) obtained or generated during receiver surge pressure testing 18 (see FIGS. 1, 6). The test set of surge pressure data 132 (see FIG. 6) comprises test data 130 (see FIG. 6) of surge pressures 26 (see FIG. 6) generated in the receiver STT 12 (see FIG. 6) during receiver surge pressure testing 18 (see FIG. 6), when the receiver STT 12 (see FIG. 6) receives fuel 28 (see FIG. 6) from the refueling tanker aircraft 30a (FIG. 6) comprising the uncertified refueling tanker aircraft 30b (see FIG. 6) to be certified for aerial refueling clearance 134 (see FIG. 6). The baseline set of surge pressure data 138 (see FIG. 6) comprises baseline data 136 (see FIG. 6) of surge pressures 26 (see FIG. 6) generated in the receiver STT 12 (see FIG. 6) during receiver surge pressure testing 18 (see FIG. 6), when the receiver STT 12 (see FIG. 6) receives fuel 28 (see FIG. 6) from the refueling tanker aircraft 30a (see FIG. 3) comprising the certified refueling tanker aircraft 30c (see FIG. 6). The test set of surge pressure data 132 (see FIG. 6) is preferably compared against the baseline set of surge pressure data 138 (see FIG. 6) to obtain the set of comparison data 140 (see FIG. 6). The comparison data 140 (see FIG. 6) is used to verify that surge pressures 26 (see FIG. 6) of the test set of surge pressure data 132 (see FIG. 6) are less than, or equal to, the surge pressures 26 (see FIG. 6) of the baseline set of surge pressure data 138 (see FIG. 6).

As further shown in FIG. 6, the receiver STT system 170 may have one or more receiver surge test tool (STT) checkouts 210 performed on the receiver STT 12 of the receiver STT system 170 prior to using the receiver STT 12 for receiver surge pressure testing 18, to ensure safe and consistent operation of the receiver STT 12. The receiver STT checkouts 210 (see FIG. 6) may comprise a calibration 212 (see FIG. 6), a boom test unit (BTU) surge test 220 (see FIG. 6), a high flow surge test 228 (see FIG. 6), or another suitable receiver STT checkout 210.

As shown in FIG. 6, the calibration 212 may comprise using a fuel flow cart 214 having one or more calibrated flow meters 216 to calibrate one or more uncalibrated flow meters 218 on the receiver STT 12. During calibration 212 (see FIG. 6), fuel 28 (see FIG. 6) is allowed to flow from the supply 29 (see FIG. 6) of fuel 28 (see FIG. 6), or another supply reservoir, through the fuel flow cart 214 (see FIG. 6), through one flow line 66 (see FIG. 6) of the receiver STT 12 (see FIG. 6), and to the fuel reservoir 62 (see FIG. 6). Flow rates 72 (see FIG. 1) of the fuel flow 28a (see FIG. 6) may be measured using both the calibrated flow meters 216 (see FIG. 6) on the fuel flow cart 214 (see FIG. 6) and the uncalibrated flow meters 218 (see FIG. 6) on the receiver STT 12 (see FIG. 6). By comparing the two values of the calibrated flow meters 216 (see FIG. 6) and the uncalibrated flow meters 218 (see FIG. 6), a calibration curve can be developed for the uncalibrated flow meters 218 (see FIG. 6). This same test can be run for a variety of flow rates 72 (see FIG. 6), increasing in defined increments until the flow rate 72 (see FIG. 6) is above the maximum required flow rate (e.g., 1200 gpm (gallons per minute)) for each of the four (4) flow lines 66 (see FIG. 6) of the receiver STT 12 (see FIG. 6).

As shown in FIG. 6, the boom test unit (BTU) surge test 220 may comprise surge testing with the boom test unit (BTU) 182a using a receptacle test tool (RTT) 222, which consists of a boom nozzle 224 and associated circuitry 226 to connect the supply 29 of fuel 28 to the BTU 182a through its receptacle 190a. The RTT 222 (see FIG. 6) may be connected to a fuel supply flex hose via a single point connection, and fuel 28 (see FIG. 6) can flow through the BTU 182a (see FIG. 6), and then through the receiver STT 12 (see FIG. 6). With this BTU surge test 220 (see FIG. 6), surge pressures 26 (see FIG. 6) may be created using the receiver STT 12 (see FIG. 6) at a variety of flow rates 72 (see FIG. 1) of the fuel flow 28a (see FIG. 6), up to 600 gpm (gallons per minute), as the RTT 222 (see FIG. 6) may not be suitable for flow rates higher than 600 gpm. Surge pressures 26 (see FIG. 6) may be created by closing the shutoff valve 76 (see FIG. 1), such as the pneumatically actuated ball valve 76a (see FIG. 1), on the flow line 66 (see FIGS. 1, 6) that is active. This procedure is preferably repeated for all four (4) flow lines 66 (see FIG. 6), and for both four-inch diameter 68c (see FIGS. 1, 2A) flow lines 66a, 66c, of the receiver STT 12 (see FIGS. 1, 2A, 6), using both the low speed 80a (see FIG. 1) and the high speed 80b (see FIG. 1) of the shutoff valve 76 (see FIGS. 1, 2A), such as the pneumatically actuated ball valve 76a (see FIGS. 1, 2A), and a variety of positions of the manual back pressure valve 90 (see FIG. 1), such as the manual butterfly valve 90a (see FIG. 1). Valve close rates 78 (see FIGS. 1, 5) may be recorded and adjusted to ensure the valve close rates 78 (see FIGS. 1, 5) meet requirements for the surge pressure conditions 20 (see FIG. 6).

As shown in FIG. 6, the receiver STT checkout 210 may further comprise the high flow surge test 228. Since the receptacle test tool (RTT) 222 is only rated for flow rates 72 (see FIG. 1) up to 600 gpm (gallons per minute), receiver surge pressure testing 18 (see FIG. 6) at higher flow rates 72 (see FIG. 1) of greater than 600 gpm may need to be performed without the RTT 222 (see FIG. 6) and the BTU 182a (see FIG. 6). The high flow surge test 228 (see FIG. 6) involves connecting the supply 29 (see FIG. 6) of fuel 28 (see FIG. 6) directly to the inlet port 40 (see FIG. 6) of the receiver STT 12 (see FIG. 6) using a flexible connector hose 230 (see FIG. 6), such as a six-inch diameter flexible connector hose or another suitably sized flexible connector hose 230. The receiver STT 12 (see FIG. 6) may then be connected to the fuel return system 60 (see FIG. 6) via the connection elements 208 (see FIGS. 7-8), for example, two (2) four-inch flexible hoses. The procedure for the high flow surge test 228 (see FIG. 6) will be the same as that for the BTU surge test 220 (see FIG. 6), except with flow rates 72 (see FIG. 1) varying from 600 gpm to 1200 gpm.

Figure 10:
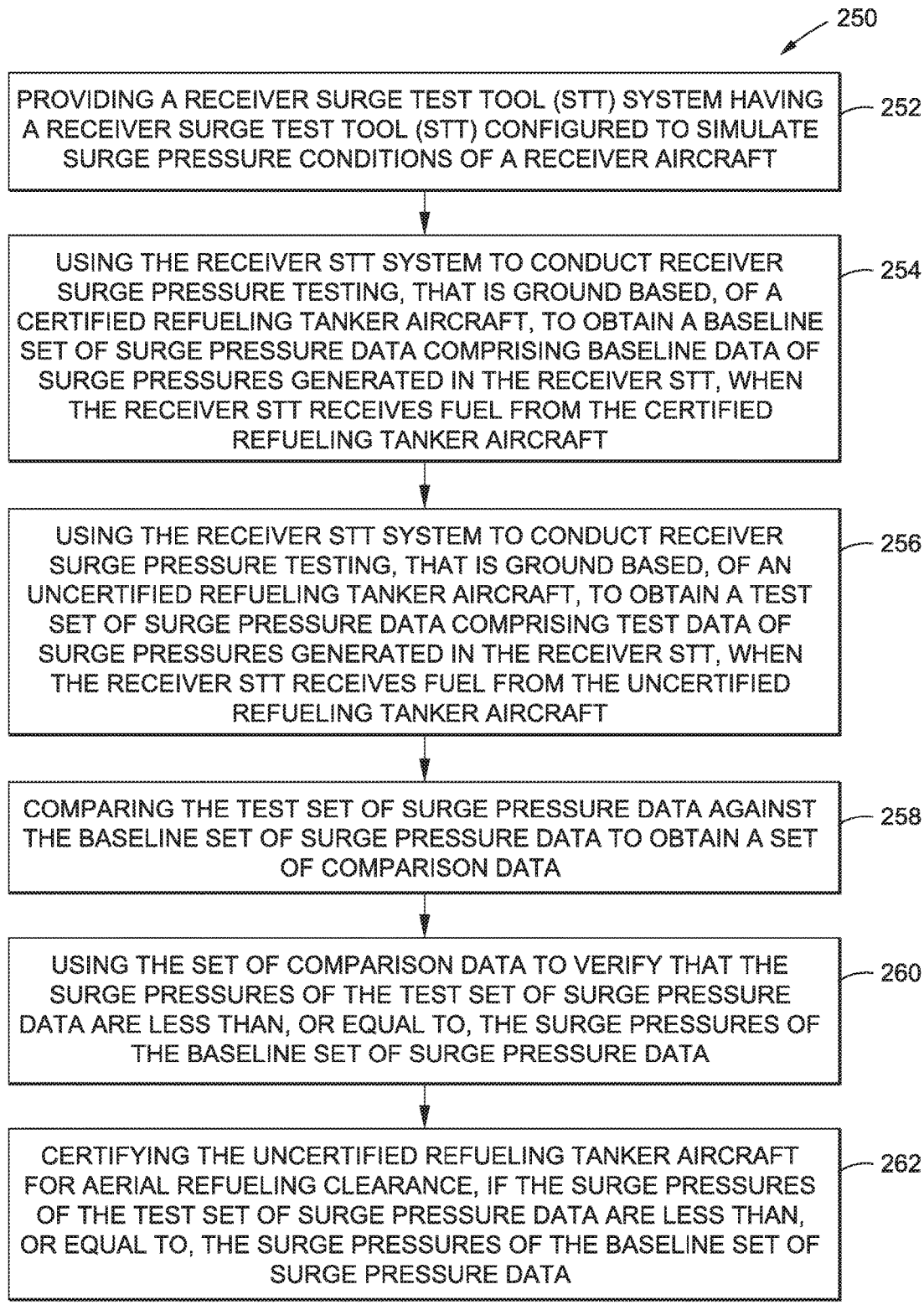
FIG. 10 is an illustration of a block flow diagram of an exemplary embodiment of a method of the disclosure.

Referring now to FIG. 10, in another embodiment there is provided a method 250 of using the receiver STT system 170 (see FIG. 6) to conduct receiver surge pressure testing 18 (see FIG. 6) to certify an uncertified refueling tanker aircraft 30b (see FIG. 6) for aerial refueling clearance 134 (see FIG. 6). FIG. 10 is an illustration of a block flow diagram of an exemplary embodiment of the method 250 of the disclosure.

As shown in FIG. 10, the method 250 comprises step 252 of providing the receiver STT system 170 (see FIG. 6) having the receiver STT 12 (see FIG. 6) configured to simulate surge pressure conditions 20 (see FIG. 6) of a receiver aircraft 24 (see FIG. 1). The step 252 (see FIG. 10) of providing the receiver STT system 170 (see FIG. 6) further comprises providing the receiver STT system 170 (see FIGS. 6-8) comprising an aircraft boom 174a (see FIGS. 6-8) which is configured to be attached to one of either the certified refueling tanker aircraft 30c (see FIG. 6) for receiver surge pressure testing 18 (see FIG. 6) of the certified refueling tanker aircraft 30c (see FIG. 6), or the uncertified refueling aircraft tanker 30b (see FIG. 6) for receiver surge pressure testing 18 (see FIG. 6) of the uncertified refueling tanker aircraft 30b (see FIG. 6).

The receiver STT system 170 (see FIGS. 6-8) further comprises the boom test unit (BTU) 182a (see FIGS. 6-9B) comprising the receptacle 190a (see FIG. 9A) configured for connection to the aircraft boom 174a (see FIGS. 6-8). The receiver STT system 170 (see FIGS. 6-8) further comprises the connector hose 184a (see FIGS. 6-8) having the first end 206a (see FIG. 8) connected to the BTU 182a (see FIG. 8) and the second end 206b (see FIG. 8) connected to the receiver STT 12 (see FIG. 8).

The receiver STT system 170 (see FIG. 6) further comprises the receiver STT assembly 10 (see FIGS. 1, 2A, 6), as discussed above, which comprises the receiver STT 12 (see FIGS. 1, 2A, 6) having the pipe manifold structure 32 (see FIGS. 1, 2A, 6) with the inlet port 40 (see FIGS. 1, 2A, 6), one or more outlet ports 56 (see FIGS. 1, 2A, 6), one or more flow lines 66 (see FIGS. 1, 2A, 6) disposed between the inlet port 40 (see FIGS. 1, 2A, 6) and the one or more outlet ports 56 (see FIGS. 1, 2A, 6), the temperature probe 44 (see FIGS. 1, 2A, 6) coupled to the inlet port 40 (see FIGS. 1, 2A, 6) to measure the temperature 46 (see FIG. 1) of the fuel 28 (see FIGS. 1, 6) received into the receiver STT 12 (see FIGS. 1, 6), and one or more drive connection ports 94 (see FIGS. 1, 6) configured to connect to the valve control system 95 (see FIG. 1).

The one or more drive connection ports 94 (see FIGS. 1, 6) of the receiver STT 12 (see FIGS. 1, 6) are preferably configured to connect to the valve control system 95 (see FIG. 1), which comprises the pneumatic system 96 (see FIGS. 1, 4A), the hydraulic system 98 (see FIGS. 1, 4B), the electrical system 100 (see FIG. 1), or another suitable valve control system 95 (see FIG. 1), to drive closure of the shutoff valve 76 (see FIG. 1) of each flow line 66 (see FIG. 1).

The receiver STT system 170 (see FIGS. 6-8), as discussed above, further comprises the fuel return system 60 (see FIGS. 6-8) connected to the one or more outlet ports 56 (see FIG. 6) of the receiver STT 12 (see FIGS. 6-8). The fuel return system 60 (see FIGS. 6-8) is configured to receive the fuel 28 (see FIG. 6) from the receiver STT 12 (see FIGS. 6-8). The receiver STT system 170 (see FIGS. 6-8) further comprises the control system 14 (see FIGS. 6-8), as discussed above, coupled to the receiver STT 12 (see FIGS. 6-8) and to the adapter assembly 180 (see FIG. 8), for example, the BTU 182a (see FIGS. 6-8), for controlling an open position 156a (see FIG. 1) and a close position 156b (see FIG. 1) of the shutoff valve 76 (see FIG. 1) on each of the one or more flow lines 66 (see FIG. 1), for controlling the receiver STT 12 (see FIGS. 6-8), and for controlling the adapter assembly 180 (see FIG. 8), for example, the BTU 182a (see FIGS. 6-8). The receiver STT system 170 (see FIGS. 6-8) further comprises the data system 16 (see FIGS. 6-8), as discussed above, coupled to the receiver STT 12 (see FIGS. 6-8) and the adapter assembly 180 (see FIG. 8), for example, the BTU 182a (see FIGS. 6-8), for collecting and recording the test data 130 (see FIG. 6) and the baseline data 136 (see FIG. 6) generated during the receiver surge pressure testing 18 (see FIG. 6).

As discussed above and shown in FIG. 1, each flow line 66 of the receiver STT 12 comprises the flow meter 70 for measuring the flow rate 72 of the fuel flow 28a of the fuel 28. Preferably, the flow meter 70 (see FIG. 1) comprises the ultrasonic flow meter 70a (see FIG. 1) for measuring the volumetric flow rate 73 (see FIG. 1) of the fuel flow 28a (see FIG. 1). As discussed above and shown in FIG. 1, each flow line 66 further comprises the pressure transducer 74 for measuring the surge pressure 26 of the fuel flow 28a of the fuel 28. Preferably, the pressure transducer 74 (see FIG. 1) comprises the dynamic pressure transducer 74a (see FIG. 1) for measuring the surge pressure 26 (see FIG. 1) of the fuel flow 28a (see FIG. 1). As discussed above and shown in FIG. 1, each flow line 66 further comprises the shutoff valve 76, which preferably comprises the pneumatically actuated ball valve 76a (see FIG. 1) having two regulated air flow paths 88 (see FIG. 1) set to cause valve close rates 78 (see FIGS.

1, 5) comprising one of the 2 second valve close rate 78a (see FIGS. 1, 5) and the 0.5 second valve close rate 78b (see FIGS. 1, 5). As discussed above and shown in FIG. 1, each flow line 66 further comprises the manual back pressure valve 90 for adjusting back pressure 92. Preferably, the manual back pressure valve 90 (see FIG. 1) comprises the manual butterfly valve 90a (see FIG. 1) for creating different back pressures 92 (see FIG. 1) that simulate different receiver aircraft 24 (see FIG. 1).

As shown in FIG. 10, the method 250 further comprises step 254 of using the receiver STT system 170 (see FIG. 6) to conduct receiver surge pressure testing 18 (see FIG. 6), that is ground based, of the certified refueling tanker aircraft 30c (see FIG. 6), to obtain the baseline set of surge pressure data 138 (see FIG. 6) comprising baseline data 136 (see FIG. 6) of surge pressures 26 (see FIG. 6) generated in the receiver STT 12 (see FIG. 6), when the receiver STT 12 (see FIG. 6) receives fuel 28 (see FIG. 6) from the certified refueling tanker aircraft 30c (see FIG. 6).

As shown in FIG. 10, the method 250 further comprises step 256 of using the receiver STT system 170 (see FIG. 6) to conduct receiver surge pressure testing 18 (see FIG. 6), that is ground based, of the uncertified refueling tanker aircraft 30b (see FIG. 6) to obtain the test set of surge pressure data 132 (see FIG. 6) comprising test data 130 (see FIG. 6) of surge pressures 26 (see FIG. 6) generated in the receiver STT 12 (see FIG. 6), when the receiver STT 12 (see FIG. 6) receives fuel 28 (see FIG. 6) from the uncertified refueling tanker aircraft 30b (see FIG. 6).

The instrumentation configuration 142 (see FIG. 3) or setup for the receiver STT 12 (see FIG. 3) is shown schematically in FIG. 3. The following procedure may be followed when setting up the receiver STT 12 (see FIG. 3) prior to conducting the receiver surge pressure testing 18 (see FIG. 1):

(1) position the receiver STT 12 (see FIGS. 7-8) into position behind the BTU 182a (see FIGS. 7-8);

(2) connect a first end 206a (see FIGS. 7-8) of a six-inch diameter flanged connector hose 184a (see FIGS. 7-8) to a six-inch diameter BTU outlet 202 (see FIG. 9B) with an outlet flange 204 (see FIG. 9B) on the back of the BTU 182a (see FIG. 9B);

(3) connect a second end 206b (see FIGS. 7-8) of the six-inch diameter flanged connector hose 184a (see FIGS. 7-8) to a six-inch diameter inlet port 40 (see FIG. 2A) having the rotatable flange 42 (see FIG. 2A) on the receiver STT 12 (see FIG. 2A);

(4) connect the two outlet ports 56 (see FIGS. 1, 2A) on the receiver STT 12 (see FIGS. 1, 2A) to the fuel return system 60 (see FIGS. 7-8) using connection elements 208 (see FIGS. 7-8), such as in the form of flexible hoses;

(5) engage all the jack devices 200 (see FIG. 9A) and wheels 199 (see FIG. 9A) of the BTU 182a (see FIG. 9A), and engage the brakes on all the wheels 108 (see FIG. 2A) of the mobile apparatus 102 (see FIG. 2A); and (6) ground the receiver STT 12 (see FIG. 2A) using the grounding reel 109 (see FIG. 2A), and ensure the receiver STT 12 (see FIG. 2A) is grounded to the BTU 182a (see FIGS. 7-8) upstream and the fuel return system 60 (see FIGS. 7-8) downstream.

Setting up the instrumentation configuration 142 (see FIG. 3) for the receiver STT 12 (see FIG. 3) may involve the following procedure prior to conducting the receiver surge pressure testing 18 (see FIG. 1):

(1) connect to each flow line 66 (see FIGS. 2A, 3) of the receiver STT 12 (see FIGS. 2A, 3)-a flow meter 70 (see FIGS. 2A, 3), a pressure transducer 74 (see FIGS. 2A, 3), a shutoff valve 76 (see FIGS. 2A, 3), and a manual back pressure valve 90 (see FIGS. 2A, 3);

(2) connect a temperature probe 44 (see FIGS. 2A, 3), for example, a resistance temperature detector (RTD) or another suitable temperature measuring device, to the inlet port 40 (see FIGS. 2A, 3) of the receiver STT 12 (see FIGS. 2A, 3);

(3) connect all control connections 122 (see FIG. 1) of the control system 14 (see FIG. 1) to the receiver STT 12 (see FIG. 1);

(4) verify control connections 122 (see FIG. 1) are routed through an intrinsically safe unit outside the location of the control system 14 (see FIGS. 1, 7-8) to the CSU 110 (see FIG. 1) inside the location of the control system 14 (see FIGS. 1, 7-8) per direction from the instrumentation configuration 142 (see FIG. 3);

(5) connect a 100 psi air supply 97a (see FIG. 7) to the drive connection port 94 (see FIG. 7) on the receiver STT 12 (see FIG. 7);

(6) attach one or more optional weights 198 (see FIG. 7), such as bags of shot, to the BTU 182a (see FIG. 7) and between the BTU 182a (see FIG. 7) and the receiver STT 12 (see FIG. 7);

(7) power on the CSU 110 (see FIG. 1);

(8) set the valve close rate 78 (see FIGS. 1, 5) by adjusting valve position indicators 156 (see FIGS. 1, 5) on the receiver STT 12 (see FIG. 1);

(9) on the CSU 110 (see FIG. 1), access the receiver STT HMI 114 (see FIG. 5) and the CSU receiver STT dual rate valve control panel 160 (see FIG. 5);

(10) use the control buttons 164 (see FIG. 5) on the CSU receiver STT dual rate valve control panel 160 (see FIG. 5) to close each shutoff valve 76 (see FIG. 5), one at a time, opening the previous shutoff valve 76 (see FIG. 5) before closing the next;

(11) verify that the shutoff valves 76 (see FIG. 5) have closed at the desired speed 80 (see FIG. 1), where the low speed 80a (see FIG. 1) or slow speed is the 2 second valve close rate 78a (±0.1 seconds) (see FIG. 5), and the high speed 80b (±0.1 seconds) (see FIG. 1) is the 0.5 second valve close rate 78b (see FIG. 5);

(12) open all the shutoff valves 76 (see FIGS. 1, 2A), such as the pneumatically actuated ball valves 76a (see FIGS. 1, 2A);

(13) open all the manual back pressure valves 90 (see FIGS. 1, 2A), such as the manual butterfly valves 90a (see FIGS. 1, 2A); and

(14) ensure all rotatable flanges 42 (see FIG. 2A) and flanges 43 (see FIG. 2A) are tight and all camlock fittings 58 (see FIG. 2A) are secured, and verify all drain ports 52 (see FIG. 2D) are closed with caps installed.

Operating the receiver STT system 170 (see FIG. 6) and receiver STT 12 (see FIGS. 1, 6) may involve the following procedures:

(1) prime the receiver STT 12 (see FIGS. 1, 6) prior to conducting the receiver surge pressure testing 18 (see FIGS. 1, 6) at the start of each shift or after a significant period of down time, and preferably remove all air 97 (see FIG. 4A) from the receiver STT system 170 (see FIG. 6), as air in the flow lines 66 (see FIGS. 1, 2A, 6) may interfere with flow meter 70 (see FIGS. 1, 2A) readings, causing them to read incorrectly, and in priming the receiver STT 12(see FIGS. 1, 6), the following steps may be conducted: (a) supply fuel 28 (see FIGS. 1, 6) to the receiver STT 12 (see FIGS. 1, 6) at a flow rate 72 (see FIG. 1) that is a minimum, e.g., approximately, 100 gpm (gallons per minute); (b) configure the manual back pressure valves 90 (see FIGS. 1, 2A), such as the manual butterfly valves 90a (see FIGS. 1, 2A), so that fuel 28 (see FIGS. 1, 6) is only flowing through one flow line 66 (see FIGS. 1, 2A) of the receiver STT 12 (see FIGS. 1, 6); (c) open the one or more air bleed ports 50 (see FIGS. 1, 2A) at the one or more inlet ports 40 (see FIGS. 1, 2A) of the receiver STT 12 (see FIGS. 1, 2A), and leave it open until only fuel 28 (see FIGS. 1, 2A) starts to come out, and catch any residual fuel 28b (see FIG. 1) in a container; and (d) close the one or more air bleed ports 50 (see FIGS. 1, 2A);

(2) move onto the next flow line 66 (see FIGS. 1, 2A) of the receiver STT 12 (see FIGS. 1, 2A), and repeat steps (a)-(d) for all flow lines 66 (see FIGS. 1, 2A);

(3) open all shutoff valves 76 (see FIGS. 1, 2A), such as the pneumatically actuated ball valves 76a (see FIGS. 1, 2A); (4) open all manual back pressure valves 90 (see FIGS. 1, 2A), such as the manual butterfly valves 90a (see FIGS. 1, 2A);

(4) close the fuel return system 60 (see FIGS. 1, 7-8) downstream of the receiver STT 12 (see FIGS. 1, 7-8), and the pressure of the fuel 28 (see FIG. 1) in the receiver STT 12 (see FIGS. 1, 7-8) will increase to approximately 50 psi;

(5) check the receiver STT 12 (see FIGS. 1, 7-8) for leaks for approximately one minute;

(6) stop supplying fuel 28 (see FIG. 1) to the receiver STT 12 (see FIGS. 1, 7-8); and (7) open the fuel return system 60 (see FIGS. 1, 7-8) downstream of the receiver STT 12 (see FIGS. 1, 7-8).

The four shutoff valves 76 (see FIGS. 1, 2A), such as the pneumatically actuated ball valves 76a (see FIGS. 1, 2A), on the receiver STT 12 (see FIGS. 1, 2A) may be operated from the CSU receiver STT dual rate valve control panel 160 (see FIG. 5), and the following procedure may be used for opening and closing the shutoff valves 76 (see FIGS. 1, 2A), such as the pneumatically actuated ball valves 76a (see FIGS. 1, 2A), on the receiver STT 12 (see FIGS. 1, 2A):

(1) access the CSU receiver STT dual rate valve control panel 160 (see FIG. 5) that includes the status button 82 (see FIG. 5) for the "OPEN" status 84 (see FIG. 5) and the "CLOSE" status 86 (see FIG. 5) for each shutoff valve 76 (see FIG. 5), the valve close rate 78 (see FIG. 5) of the 2 second valve close rate 78a (see FIG. 5) and the 0.5 second valve close rate 78b (see FIG. 5), and allows a user to command valve position indicators 156 (see FIG. 5) of the open position 156a (see FIG. 5) and the close position 156b (see FIG. 5), and a user may also open or close all shutoff valves 76 (see FIG. 5) simultaneously with an "OPEN ALL" button 166 (see FIG. 5) or a "CLOSE ALL" button 168 (see FIG. 5);

(2) use the control buttons 164 (see FIG. 5) to open and close the shutoff valves 76 (see FIG. 5), as needed; and (3) at the end of the surge test 162 (see FIG. 5), use the "CLOSE ALL" button 168 (see FIG. 5) to ensure all shutoff valves 76 (see FIG. 5) are returned to a close position 156b (see FIG. 5).

The valve close rates 78 (see FIG. 5) of the shutoff valves 76 (see FIG. 5) may be indicated on the CSU receiver STT dual rate valve control panel 160 (see FIG. 5) but they are preferably manually set, as they may not be set using the CSU receiver STT dual rate valve control panel 160 (see FIG. 5). The following procedure may be used to set and adjust the valve close rates 78 (see FIG. 5) for the shutoff valves 76 (see FIGS. 1, 2A, 5) on the receiver STT 12 (see FIGS. 1, 2A, 6):

(1) to set the valve close rate 78 (see FIG. 5), close the selector valves 150a, 150b (see FIG. 4A) for the valve close rate 78 (see FIG. 5) not wanted (e.g., if the high speed 80b (see FIG. 1) is desired, close the low speed 80a (see FIG. 1) shutoff valve 76 (see FIG. 1));

(2) open one of the selector valves 150a, 150b (see FIG. 4A) for the desired speed 80 (see FIG. 1), i.e., high speed 80b (see FIG. 1) or low speed 80a (see FIG. 1);

(3) close one of the selector valves 150a, 150b (see FIG. 4A) at the pneumatic system 96 (see FIG. 4A) for the speed not wanted (e.g., if the high speed 80b (see FIG. 1) is desired, close the low speed 80a (see FIG. 1) shutoff valve 76 (see FIG. 1));

(4) open one of the selector valves 150a, 150b (see FIG. 4A) at the pneumatic system 96 (see FIG. 4A) for the desired speed 80 (see FIG. 1), i.e., high speed 80b (see FIG. 1) or low speed 80a (see FIG. 1);

(5) repeat steps (1)-(4) for each shutoff valve 76 (see FIG. 4A) that requires a change in the valve close rate 78 (see FIG. 5);

(6) when flowing the fuel 28 (see FIG. 1) at the desired flow rate 72 (see FIG. 1), use the control buttons 164 (see FIG. 5) on the CSU receiver STT dual rate valve control panel 160 (see FIG. 5) to close each shutoff valve 76 (see FIG. 5), one at a time, opening the previous shutoff valve 76 before closing the next; and (7) verify that the shutoff valve 76 (see FIG. 5) has closed at the desired speed 80 (see FIG. 1), and if not, and the setup is correct, the pressure reducing valves 152a, 152b (see FIG. 4A) and/or the valve position indicators 156 (see FIG. 5) or flow regulators may need to be adjusted. For coarse adjustments, adjust the valve position indicator 156 (see FIG. 5) or flow regulator. For fine adjustments, adjust the pressure reducing valves 152a, 152b (see FIG. 4A). Slightly increase the pressure and/or flow rate 72 (see FIG. 1) to increase the valve close rate 78 (see FIG. 5) or slightly decrease the pressure and/or flow rate 72 (see FIG. 1) to decrease the valve close rate 78 (see FIG. 5).

The manual back pressure valves 90 (see FIGS. 1, 2A) on the receiver STT 12 (see FIGS. 1, 2A) are preferably the manual butterfly valves 90a (see FIGS. 1, 2A) and are used to create different back pressures 92 (see FIG. 1) that simulate different receiver aircraft 24 (see FIG. 1). The following procedure may be used to operate the explains how to operate manual back pressure valves 90 (see FIGS. 1, 2A):

(1) start with all the manual back pressure valves 90 (see FIGS. 1, 2A) fully open;

(2) begin flowing fuel 28 (see FIG. 1) through the active flow line 66 (see FIGS. 1, 2A) of the receiver STT 12 (see FIG. 1);

(3) from the location of the control system 14 (see FIG. 1), monitor the pressure reading in the active flow line 66 of the receiver STT 12 (see FIG. 1);

(4) close the manual valve for the active flow line 66 (see FIG. 1) in the smallest increments possible until the desired pressure is achieved. Opening the manual back pressure valve 90 (see FIGS. 1, 2A) may decrease the back pressure 92 (see FIG. 1) and closing it will increase the back pressure 92 (see FIG. 1); and (5) at the end of the receiver surge pressure testing 18 (see FIG. 1), fully open all the manual back pressure valves 90 (see FIG. 1).

Prior to using the receiver STT system 170 (see FIG. 6) to conduct receiver surge pressure testing 18 (see FIG. 6) of the certified refueling tanker aircraft 30c (see FIG. 6) and the uncertified refueling tanker aircraft 30b (see FIG. 6), the method 250 may include performing one or more receiver surge test tool (STT) checkouts 210 (see FIG. 6). As discussed above, the receiver STT checkouts 210 (see FIG.

6) may comprise the calibration 212 (see FIG. 6), the boom test unit (BTU) surge test 220 (see FIG. 6), the high flow surge test 228 (see FIG. 6), or another suitable receiver STT checkout 210.

As discussed above, the calibration 212 (see FIG. 6) may comprise using the fuel flow cart 214 (see FIG. 6) having one or more calibrated flow meters 216 (see FIG. 6) to calibrate one or more uncalibrated flow meters 218 (see FIG. 6) on the receiver STT 12 (see FIG. 6). As further discussed above, the BTU surge test 220 (see FIG. 6) may comprise surge testing with the BTU 182a (see FIG. 6) using the receptacle test tool (RTT) 222 (see FIG. 6), which consists of the boom nozzle 224 (see FIG. 6) and the associated circuitry 226 (see FIG. 6) to connect the supply 29 (see FIG. 6) of fuel 28 (see FIG. 6) to the BTU 182a (see FIG. 6) through its receptacle 190a (see FIG. 6). As further discussed above, the high flow surge test 228 (see FIG. 6) involves connecting the supply 29 (see FIG. 6) of fuel 28 (see FIG. 6) directly to the inlet port 40 (see FIG. 6) of the receiver STT 12 (see FIG. 6) using the flexible connector hose 230 (see FIG. 6).

As shown in FIG. 10, the method 250 further comprises step 258 of comparing the test set of surge pressure data 132 (see FIG. 6) against the baseline set of surge pressure data 138 (see FIG. 6) to obtain a set of comparison data 140 (see FIG. 6).

As shown in FIG. 10, the method 250 further comprises step 260 of using the set of comparison data 140 (see FIG. 6) to verify that the surge pressures 26 (see FIG. 6) of the test set of surge pressure data 132 (see FIG. 6) are less than, or equal to, the surge pressures 26 (see FIG. 6) of the baseline set of surge pressure data 138 (see FIG. 6).

As shown in FIG. 10, the method 250 further comprises step 262 of certifying the uncertified refueling tanker aircraft 30b (see FIG. 6) for aerial refueling clearance 134 (see FIG. 6), if the surge pressures 26 (see FIG. 6) of the test set of surge pressure data 132 (see FIG. 6) are less than, or equal to, the surge pressures 26 (see FIG. 6) of the baseline set of surge pressure data 138 (see FIG. 6).

Figure 11:
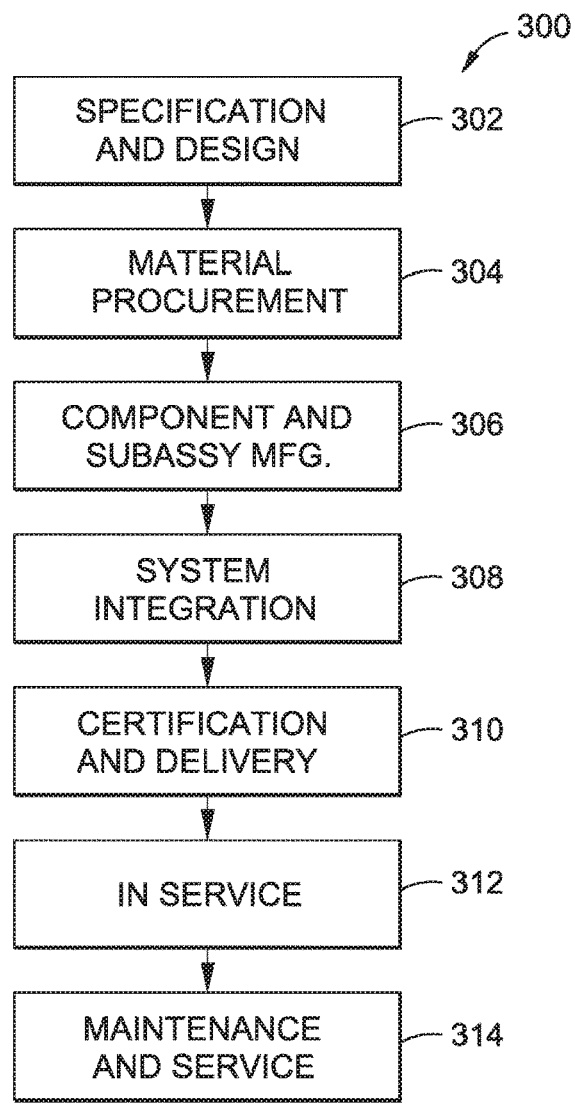
FIG. 11 is an illustration of a flow diagram of an aircraft manufacturing and service method.
Figure 12:
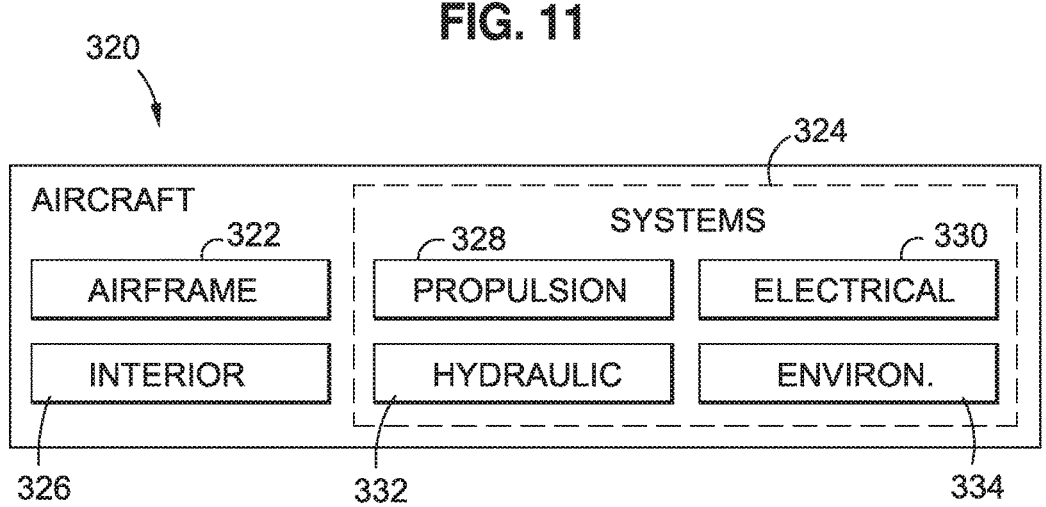
FIG. 12 is an illustration of a block diagram of an aircraft.

FIG. 11 is an illustration of a flow diagram of an aircraft manufacturing and service method 300. FIG. 12 is an illustration of a block diagram of an aircraft 320. Referring to FIGS. 11-12, embodiments of the disclosure may be described in the context of the aircraft manufacturing and service method 300 as shown in FIG. 11, and the aircraft 320 as shown in FIG. 12.

During pre-production, exemplary aircraft manufacturing and service method 300 may include specification and design 302 of the aircraft 320 and material procurement 304. During manufacturing, component and subassembly manufacturing 306 and system integration 308 of the aircraft 320 takes place. Thereafter, the aircraft 320 may go through certification and delivery 310 in order to be placed in service 312. While in service 312 by a customer, the aircraft 320 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 12, the aircraft 320 produced by the exemplary aircraft manufacturing and service method 300 may include an airframe 322 with a plurality of systems 324 and an interior 326. Examples of the plurality of systems 324 may include one or more of a propulsion system 328, an electrical system 330, a hydraulic system 332, and an environmental system 334. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 320 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 320. Similarly, one or more of apparatus embodiments, method embodiments, or a combination thereof, may be utilized while the aircraft 320 is in service 312, for example and without limitation, to maintenance and service 314.

Disclosed embodiments of the receiver surge test tool (STT) assembly 10 (see FIG. 1), the receiver surge test tool (STT) system 170 (see FIG. 6), and the method 250 (see FIG. 10) of using the receiver STT system 170 (see FIG. 6) to conduct receiver surge pressure testing 18 (see FIG. 6), that is ground based, to certify the uncertified refueling tanker aircraft 30b (see FIG. 6) for aerial refueling clearance 134 (see FIG. 6) provide a receiver STT 12 (see FIGS. 1, 2A, 6) that simulates surge pressure conditions 20 (see FIGS. 1, 6) of the fuel system 22 (see FIG. 1) of the receiver aircraft 24 (see FIGS. 1, 6). Thus, the receiver STT 12 (see FIGS. 1, 2A, 6) acts or functions as a simulated receiver aircraft 24a (see FIGS. 1, 6).

The purpose of the receiver STT 12 (see FIGS. 1, 2A, 6) is to measure the results of surge pressures 26 (see FIGS. 1, 6) of fuel flow 28a (see FIGS. 1, 6) on the simulated receiver aircraft 24a (see FIGS. 1, 6), as it is refueled by the refueling source 30 (see FIGS. 1, 6), such as the refueling tanker aircraft 30a (see FIGS. 1, 6). The receiver STT 12 (see FIGS. 1, 2A, 6) is used to simulate surge pressure 26 (see FIGS. 1, 6) of the receiver aircraft 24 (see FIGS. 1, 6) by closing the shutoff valve 76 (see FIGS. 1, 2A) on the flow line 66 (see FIGS. 1, 2A) that is active during fuel flow 28a (see FIGS. 1, 6) from the refueling tanker aircraft 30a (see FIGS. 1, 6). There are three (3) different sizes of flow lines 66 (see FIGS. 1, 2A) and two (2) valve close rates 78 (see FIGS. 1, 5). Different combinations of flow line 66 (see FIGS. 1, 2A) size and valve close rates 78 (see FIGS. 1, 5) are preferably used to simulate and characterize different surge pressure conditions 20 (see FIGS. 1, 6).

The receiver STT 12 (see FIGS. 1, 2A, 6) is instrumented to record the results of the surge pressures 26 (see FIGS. 1, 6) experienced when one of the shutoff valves 76 (see FIGS. 1, 2A), such as the pneumatically actuated ball valve 76a (see FIGS. 1, 2A), is closed as fuel 28 (see FIGS. 1, 6) flows through it. The receiver STT 12 (see FIGS. 1, 2A) has flow meters 70 (see FIGS. 1, 2A) on all flow lines 66 (see FIGS. 1, 2A) and can also be used as a flow metering cart for fuel transfer conditions.

Moreover, disclosed embodiments of the receiver STT assembly 10 (see FIG. 1), the receiver STT system 170 (see FIG. 6), and the method 250 (see FIG. 10), as compared to known assemblies, systems, and methods, avoid instrumenting any receiver aircraft 24 (see FIGS. 1, 6), allow all receiver surge pressure testing 18 (see FIGS. 1, 6) to be completed with one receiver STT 12 (see FIGS. 1, 6) instead of many receiver aircraft 24 (see FIGS. 1, 6), speed up receiver surge pressure testing 18 (see FIGS. 1, 6) due to simplicity of the receiver STT 12 (see FIGS. 1, 6), and remove any logistical needs to instrument and bring in multiple receiver aircraft 24 (see FIGS. 1, 6). For example, instead of rolling in many receiver aircraft 24 (see FIGS. 1, 6) one at a time and conducting the receiver surge pressure testing 18 (see FIGS. 1, 6) on each, the receiver STT 12 (see FIGS. 1, 2A, 6) can be set up once and all testing can be run. Thus, the receiver STT assembly 10 (see FIG. 1), the receiver STT system 170 (see FIG. 6), and the method 250 (see FIG. 10), as compared to known assemblies, systems, and methods, may be low cost, time efficient, labor efficient, and reliable.

Further, conducting the receiver surge pressure testing 18 (see FIG. 6) on the ground avoids the high cost of flight tests and avoids instrumenting numerous types of receiver aircraft 24 (see FIGS. 1, 6). For example, disclosed embodiments of the receiver STT assembly 10 (see FIG. 1), the receiver STT system 170 (see FIG. 6), and the method 250 (see FIG. 10), may certify or qualify the uncertified or unqualified or new tanker aircraft in a time period of three (3) days to seven (7) days, as compared to known assemblies, systems, and methods, which may take a time period of numerous months to several years to certify or qualify the uncertified or unqualified or new tanker aircraft.

In addition, disclosed embodiments of the receiver STT assembly 10 (see FIG. 1), the receiver STT system 170 (see FIG. 6), and the method 250 (see FIG. 10) provide a way to verify that surge pressures 26 (see FIGS. 1, 6) generated in the receiver STT 12 (see FIGS. 1, 6), when the receiver STT 12 (see FIGS. 1, 6) receives fuel 28 (see FIGS. 1, 6) from the refueling tanker aircraft 30a (see FIGS. 1, 6), such as the uncertified tanker aircraft 30b (see FIG. 6), do not exceed the surge pressures 26 (see FIGS. 1, 6) generated in the receiver STT 12 (see FIGS. 1, 6), when the receiver STT 12 (see FIGS. 1, 6) receives fuel 28 (see FIGS. 1, 6) from the certified tanker aircraft 30c (see FIG. 6), such as a qualified, legacy tanker aircraft.

The test data 130 (see FIGS. 1, 6) of surge pressures 26 (see FIGS. 1, 6) generated in the receiver STT 12 (see FIGS. 1, 6) and collected during the receiver surge pressure testing 18 (see FIGS. 1, 6) of the uncertified tanker aircraft 30b (see FIG. 6) is compared to the baseline data 136 (see FIGS. 1, 6) of surge pressures 26 (see FIGS. 1, 6) generated in the same receiver STT 12 (see FIGS. 1, 6) and collected during the receiver surge pressure testing 18 (see FIGS. 1, 6) of the certified tanker aircraft 30c (see FIG. 6). If the surge pressures 26 (see FIGS. 1, 6) of the uncertified tanker aircraft 30b (see FIG. 6) are less than, or equal to, the surge pressures 26 (see FIGS. 1, 6) of the certified tanker aircraft 30c (see FIG. 6), such as a previous tanker aircraft design that has been certified, then the aerial refueling clearance 134 (see FIG. 6) will be granted. The set of comparison data 140 (see FIGS. 1, 6) from the receiver STT 12 (see FIGS. 1, 6) may be used to determine whether the aerial refueling clearance 134 (see FIG. 6) for an uncertified tanker aircraft 30b (see FIG. 6), such as a new tanker aircraft, will be granted, such as for initial aerial refueling missions.

Thus, the receiver STT 12 (see FIGS. 1, 6) is preferably used to compare uncertified or unqualified or new tanker aircraft, e.g., the KC-46 tanker aircraft, to known, already certified or qualified tanker aircraft, e.g., KC-10 tanker aircraft, KC-135 tanker aircraft. If the uncertified or unqualified or new tanker aircraft's measured and collected surge pressures 26 (see FIGS. 1, 6) are below or equal to the measured and collected surge pressures 26 (see FIGS. 1, 6) of the already certified or qualified tanker aircraft, the uncertified or unqualified or new tanker aircraft would thus meet the surge pressure requirements for receiver aircraft 24 (see FIGS. 1, 6).

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A receiver surge test tool (STT) assembly for receiver surge pressure testing, the receiver STT assembly comprising:

a receiver surge test tool (STT) configured to simulate surge pressure conditions of a receiver aircraft, and configured to measure one or more surge pressures generated when receiving a fuel flow of fuel from a refueling source during the receiver surge pressure testing that is ground based, the receiver STT having a pipe manifold structure comprising:
  one or more inlet ports configured to receive the fuel flow from the refueling source;
  one or more outlet ports configured for connection to a fuel return system; and
  one or more flow lines disposed between the one or more inlet ports and the one or more outlet ports, each flow line configured to move the fuel flow from the one or more inlet ports to the one or more outlet ports, and each flow line comprising:
    a flow meter for measuring a flow rate of the fuel flow through the flow line;
    a pressure transducer for measuring the surge pressure of the fuel flow through the flow line;
    a shutoff valve having varying valve close rates and having two sets of valve position indicators for indicating an open position and a close position; and
    a manual back pressure valve for adjusting back pressure;
a control system coupled to the receiver STT for controlling the open position and the close position of the shutoff valve, and for controlling the receiver STT; and
a data system coupled to the receiver STT for collecting and recording data generated during the receiver surge pressure testing.

2. The receiver surge test tool (STT) assembly of claim 1 further comprising a mobile apparatus coupled to the receiver STT to allow the receiver STT to be mobile.

3. The receiver surge test tool (STT) assembly of claim 1 further comprising one or more air bleed ports coupled to the receiver STT to prime the receiver STT prior to the receiver surge pressure testing to ensure no air is in the receiver STT; one or more drain ports coupled to the receiver STT to drain residual fuel out of the receiver STT; and a grounding reel configured to ground the receiver STT to prevent static buildup in the one or more flow lines.

4. The receiver surge test tool (STT) assembly of claim 1 wherein the receiver STT further comprises a temperature probe coupled to one of the one or more inlet ports to measure a temperature of the fuel flow received into the one or more inlet ports.

5. The receiver surge test tool (STT) assembly of claim 1 wherein the pipe manifold structure comprises four flow lines, including one one-inch diameter flow line, one two-inch diameter flow line, and two four-inch diameter flow lines.

6. The receiver surge test tool (STT) assembly of claim 1 wherein the flow meter is an ultrasonic flow meter for measuring volumetric flow rate of the fuel flow; the pressure transducer is a dynamic pressure transducer for measuring the surge pressure of the fuel flow; the shutoff valve is a pneumatically actuated ball valve having two regulated air flow paths set to cause valve close rates comprising one of a 2 second valve close rate and a 0.5 second valve close rate; and the manual back pressure valve is a manual butterfly valve for creating back pressures that simulate different receiver aircraft.

7. The receiver surge test tool (STT) assembly of claim 1 wherein the refueling source is an uncertified refueling tanker aircraft to be certified for aerial refueling clearance, and wherein a test set of surge pressure data obtained when the receiver STT receives fuel from the uncertified refueling tanker aircraft is compared against a baseline set of surge pressure data obtained from receiver surge pressure testing, when the receiver STT receives fuel from a certified refueling tanker aircraft, to obtain comparison data used to verify that surge pressures of the test set of surge pressure data are less than, or equal to, surge pressures of the baseline set of surge pressure data.

8. The receiver surge test tool (STT) assembly of claim 1 wherein the control system comprises one or more of a control system unit (CSU) comprising a programmable logic controller (PLC) and a receiver surge test tool (STT) human-machine interface (HMI), a power source, one or more computers with one or more computer processors, one or more control connections, and one or more software programs.

9. The receiver surge test tool (STT) assembly of claim 1 wherein the receiver STT further comprises one or more drive connection ports configured to connect to a valve control system comprising one of a pneumatic system, a hydraulic system, and an electrical system, to drive closure of each shutoff valve.

10. A receiver surge test tool (STT) system for receiver surge pressure testing, the system comprising:
a refueling source having a supply of fuel and one or more fuel pumps configured to initiate a fuel flow of the fuel out of the refueling source and through an elongated refueling tube coupled to the refueling source;
an adapter assembly having a first portion connected to the elongated refueling tube and having a second portion, the adapter assembly configured to receive the fuel flow from the elongated refueling tube into the first portion, and configured to move the fuel flow from the first portion to the second portion; and
a receiver surge test tool (STT) assembly comprising:
a receiver surge test tool (STT) coupled to the second portion of the adapter assembly, the receiver STT configured to simulate surge pressure conditions of a receiver aircraft, and configured to measure one or more surge pressures generated when receiving the fuel flow during the receiver surge pressure testing that is ground based, the receiver STT comprising:
a pipe manifold structure comprising:
an inlet port configured to receive the fuel flow from the adapter assembly;
one or more outlet ports; and
one or more flow lines disposed between the inlet port and the one or more outlet ports, each flow line configured to move the fuel flow from the inlet port to the one or more outlet ports, and each flow line comprising a flow meter, a pressure transducer, a shutoff valve having varying valve close rates and having two sets of valve position indicators for indicating an open position and a close position, and a manual back pressure valve;
a temperature probe coupled to the inlet port to measure a temperature of the fuel flow received into the inlet port; and
one or more drive connection ports configured to connect to a valve control system comprising one of a pneumatic system, a hydraulic system, and an electrical system, to drive closure of each shutoff valve;
a fuel return system connected to the one or more outlet ports of the receiver STT, the fuel return system configured to receive the fuel flow from the receiver STT and configured to move the fuel flow to a fuel reservoir;
a control system coupled to the receiver STT and to the adapter assembly, for controlling the open position and the close position of the shutoff valve, for controlling the receiver STT, and for controlling the adapter assembly; and
a data system coupled to the receiver STT and the adapter assembly, for collecting and recording data generated during the receiver surge pressure testing.

11. The receiver surge test tool (STT) system of claim 10 further comprising one or more air bleed ports coupled to the receiver STT to prime the receiver STT prior to the receiver surge pressure testing to ensure no air is in the receiver STT; one or more drain ports coupled to the receiver STT to drain residual fuel out of the receiver STT; and a mobile apparatus coupled to the receiver STT and having a grounding reel configured to ground the receiver STT to prevent static buildup in the one or more flow lines.

12. The receiver surge test tool (STT) system of claim 10 wherein the refueling source is an uncertified refueling tanker aircraft to be certified for aerial refueling clearance, and wherein a test set of surge pressure data obtained when the receiver STT receives fuel from the uncertified refueling tanker aircraft is compared against a baseline set of surge pressure data obtained from receiver surge pressure testing, when the receiver STT receives fuel from a certified refueling tanker aircraft, to obtain comparison data used to verify that surge pressures of the test set of surge pressure data are less than, or equal to, surge pressures of the baseline set of surge pressure data.

13. The receiver surge test tool (STT) system of claim 10 wherein the refueling source is a refueling tanker aircraft and the elongated refueling tube is an aircraft boom attached to a tail portion of the refueling tanker aircraft.

14. The receiver surge test tool (STT) system of claim 13 wherein the first portion of the adapter assembly comprises a boom test unit (BTU) comprising a receptacle for connection to the aircraft boom, and wherein the second portion of the adapter assembly comprises a connector hose having a first end connected to the BTU and a second end connected to the inlet port of the receiver STT.

15. The receiver surge test tool (STT) system of claim 10 wherein the flow meter is an ultrasonic flow meter for measuring volumetric flow rate of the fuel flow; the pressure transducer is a dynamic pressure transducer for measuring the surge pressure of the fuel flow; the shutoff valve is a pneumatically actuated ball valve having two regulated air flow paths set to cause valve close rates comprising one of a 2 second valve close rate and a 0.5 second valve close rate; and the manual back pressure valve is a manual butterfly valve for creating back pressures that simulate different receiver aircraft.

16. A method of using a receiver surge test tool (STT) system to conduct receiver surge pressure testing to certify an uncertified refueling tanker aircraft for aerial refueling clearance, the method comprising the steps of:

providing the receiver surge test tool (STT) system having a receiver surge test tool (STT) configured to simulate surge pressure conditions of a receiver aircraft;

using the receiver STT system to conduct receiver surge pressure testing, that is ground based, of a certified refueling tanker aircraft, to obtain a baseline set of surge pressure data comprising baseline data of surge pressures generated in the receiver STT, when the receiver STT receives fuel from the certified refueling tanker aircraft;

using the receiver STT system to conduct receiver surge pressure testing, that is ground based, of the uncertified refueling tanker aircraft, to obtain a test set of surge pressure data comprising test data of surge pressures generated in the receiver STT, when the receiver STT receives fuel from the uncertified refueling tanker aircraft;

comparing the test set of surge pressure data against the baseline set of surge pressure data to obtain a set of comparison data;

using the set of comparison data to verify that the surge pressures of the test set of surge pressure data are less than, or equal to, the surge pressures of the baseline set of surge pressure data; and certifying the uncertified refueling tanker aircraft for aerial refueling clearance, if the surge pressures of the test set of surge pressure data are less than, or equal to, the surge pressures of the baseline set of surge pressure data.

17. The method of claim 16 wherein providing the receiver surge test tool (STT) system further comprises providing the receiver STT system comprising:

an aircraft boom attached to one of the certified refueling tanker aircraft and the uncertified refueling aircraft tanker;

a boom test unit (BTU) comprising a receptacle configured for connection to the aircraft boom, and a connector hose having a first end connected to the BTU and a second end connected to the receiver STT; and a receiver surge test tool (STT) assembly comprising:

the receiver surge test tool (STT) comprising a pipe manifold structure with an inlet port, one or more outlet ports, one or more flow lines disposed between the inlet port and the one or more outlet ports, a temperature probe coupled to the inlet port to measure a temperature of the fuel received into the receiver STT, and one or more drive connection ports configured to connect to a valve control system;

a fuel return system connected to the one or more outlet ports of the receiver STT, the fuel return system configured to receive the fuel from the receiver STT;

a control system coupled to the receiver STT and to the BTU, for controlling an open position and a close position of a shutoff valve on each of the one or more flow lines, for controlling the receiver STT, and for controlling the BTU; and a data system coupled to the receiver STT and the BTU, for collecting and recording the test data and the baseline data generated during the receiver surge pressure testing.

18. The method of claim 17 wherein each flow line of the receiver STT comprises a flow meter for measuring a flow rate of a fuel flow of the fuel; a pressure transducer for measuring the surge pressure of the fuel flow of the fuel; the shutoff valve comprising a pneumatically actuated ball valve having two regulated air flow paths set to cause valve close rates comprising one of a 2 second valve close rate and a 0.5 second valve close rate; and a manual back pressure valve for adjusting back pressure.

19. The method of claim 17 wherein the one or more drive connection ports of the receiver STT are configured to connect to the valve control system comprising one of a pneumatic system, a hydraulic system, and an electrical system, to drive closure of the shutoff valve on each of the one or more flow lines.

20. The method of claim 16 wherein prior to using the receiver STT system to conduct receiver surge pressure testing of the certified refueling tanker aircraft and the uncertified refueling tanker aircraft, performing one or more receiver surge test tool (STT) checkouts comprising one of a calibration, a boom test unit (BTU) surge test, and a high flow surge test.

* * * * *